(12) United States Patent
Sugiyama et al.

(10) Patent No.: US 9,140,571 B2
(45) Date of Patent: *Sep. 22, 2015

(54) DISPLAY CONTROL APPARATUS

(75) Inventors: Hitoshi Sugiyama, Anjo (JP); Shigeo Kato, Kariya (JP); Yoshihiro Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/235,187

(22) PCT Filed: Aug. 9, 2012

(86) PCT No.: PCT/JP2012/005079
§ 371 (c)(1),
(2), (4) Date: Jan. 27, 2014

(87) PCT Pub. No.: WO2013/021653
PCT Pub. Date: Feb. 14, 2013

(65) Prior Publication Data
US 2014/0152433 A1    Jun. 5, 2014

(30) Foreign Application Priority Data

Aug. 11, 2011 (JP) .................................. 2011-176033
Sep. 8, 2011 (JP) .................................. 2011-196098
Dec. 28, 2011 (JP) .................................. 2011-288063
Dec. 28, 2011 (JP) .................................. 2011-288064
Jul. 25, 2012 (JP) .................................. 2012-164976
Jul. 25, 2012 (JP) .................................. 2012-164977
Aug. 8, 2012 (JP) .................................. 2012-176321
Aug. 8, 2012 (JP) .................................. 2012-176322

(51) Int. Cl.
*G06F 7/00* (2006.01)
*G01C 21/36* (2006.01)
(Continued)

(52) U.S. Cl.
CPC ............ *G01C 21/3602* (2013.01); *B60K 35/00* (2013.01); *H04N 21/472* (2013.01); *B60K 2350/1096* (2013.01); *B60K 2350/352* (2013.01); *G06F 5/00* (2013.01)

(58) Field of Classification Search
CPC ......................... G01C 21/3602; H04N 21/472
See application file for complete search history.

(56) References Cited

U.S. PATENT DOCUMENTS 6,710,789 B1     3/2004   Sekiguchi et al.
7,065,712 B2 *   6/2006   Muto et al. .................... 715/760
(Continued)

FOREIGN PATENT DOCUMENTS

JP    10-287188 A    10/1998
JP    10-297319 A    11/1998
(Continued)

OTHER PUBLICATIONS

International Search Report and Written Opinion of the International Searching Authority mailed Nov. 13, 2012 for the corresponding international application No. PCT/JP2012/005079 (with English translation).
(Continued)

*Primary Examiner* — Van Trieu
(74) *Attorney, Agent, or Firm* — Posz Law Group, PLC

(57) ABSTRACT

A display control apparatus that assigns display target contents to a plurality of areas configured as display areas in a screen of a display apparatus mounted on a vehicle is provided. The display control apparatus comprises a content manager for managing the contents in association with content information indicating attributes of the contents, an area manager for managing the areas in association with area information indicating attributes of the areas, and a content assignment controller for generating a content list listing the contents and determining content-area combinations based on the content information and the area information in an order of the content list.

45 Claims, 22 Drawing Sheets

(51) Int. Cl.
  *H04N 21/472* (2011.01)
  *B60K 35/00* (2006.01)
  *G06F 5/00* (2006.01)

(56) References Cited

U.S. PATENT DOCUMENTS

| | | | |
|---|---|---|---|
| 7,136,749 B2 * | 11/2006 | Ichihara et al. | 701/533 |
| 8,548,677 B2 * | 10/2013 | Sugiyama et al. | 701/36 |
| 8,619,092 B2 * | 12/2013 | Yamauchi | 345/592 |
| 2002/0100058 A1 | 7/2002 | Hirose et al. | |
| 2005/0179711 A1 | 8/2005 | Yoshida | |
| 2007/0113175 A1 | 5/2007 | Iwasaki | |
| 2008/0250027 A1 | 10/2008 | Hirose et al. | |
| 2009/0115592 A1 | 5/2009 | Miake et al. | |
| 2010/0117810 A1 | 5/2010 | Hagiwara et al. | |
| 2010/0164698 A1 | 7/2010 | Tsubooka et al. | |
| 2012/0215404 A1 | 8/2012 | Sugiyama et al. | |

FOREIGN PATENT DOCUMENTS

| | | |
|---|---|---|
| JP | A-11-282834 | 10/1999 |
| JP | 11-311545 | 11/1999 |
| JP | 2004-042683 A | 2/2004 |
| JP | 2006-285434 | 10/2006 |
| JP | 2007-145137 A | 6/2007 |
| JP | 2007-299325 A | 11/2007 |
| JP | 2008-301264 | 12/2008 |
| JP | A-2008-301164 | 12/2008 |
| JP | 2009-223061 A | 10/2009 |
| JP | 2010-15300 | 1/2010 |
| JP | 2011-055343 A | 3/2011 |
| JP | 2011-141699 A | 7/2011 |
| JP | 2011-193040 | 9/2011 |
| JP | 2011-204023 | 10/2011 |
| JP | 2013-137643 | 7/2013 |
| WO | WO2013/061577 | 2/2013 |
| WO | WO2013/061576 | 5/2013 |

OTHER PUBLICATIONS

Written Opinion of the International Preliminary Examining Authority mailed Jun. 25, 2013 for the corresponding international application No. PCT/JP2012/005079 (with English translation).
International Preliminary Examination Report mailed Nov. 26, 2013 in the corresponding international application No. PCT/JP2012/005079 (with English translation).
U.S. Appl. No. 14/353,154, filed Apr. 21, 2014, Ueda et al.
U.S. Appl. No. 14/353,373, filed Apr. 22, 2014, Ueda et al.
International Search Report of the International Searching Authority mailed Nov. 27, 2012 for the related international application No. PCT/JP2012/006775 (with English translation).
Written Opinion of the International Preliminary Examination Authority mailed Nov. 27, 2012 for the related international application No. PCT/JP2012/006775 (with English translation).
International Preliminary Examination Report mailed Sep. 10, 2013 in the related international application No. PCT/JP2012/006775 (with English translation).
Office Action mailed on Nov. 12, 2013 in related JP Application No. 2012-187566 (with English Translation).
Office Action mailed on Dec. 17, 2013 in related JP Application No. 2012-187564 (with English Translation).
Office Action mailed on Nov. 26, 2013 in related JP Application No. 2012-230960 (with English Translation).
International Search Report mailed Nov. 27, 2012 in a related PCT application No. PCT/JP2012/006776 (with English Translation).
Written Opinion mailed Nov. 27, 2012 in a related PCT application No. PCT/JP2012/006776 (with English Translation).
Office Action mailed on Jan. 27, 2015 in corresponding JP application No. 2012-176322 (with English translation).
Office Action mailed May 7, 2014 in the related JP application No. 2012-187564 (with English translation).
International Search Report of the International Searching Authority mailed Apr. 9, 2013 in related international application No. PCT/JP2012/008262. (with English translation).
Written Opinion mailed Apr. 9, 2013 in related PCT application No. PCT/JP2012/008262. (with English translation).
U.S. Appl. No. 14/361,737, filed May 30, 2014, Ueda et al.
Office Action mailed Feb. 24, 2015 issued in corresponding JP patent application No. 2012-271465 (and English translation).
Office Action mailed May 12, 2015 issued in corresponding JP patent application No. 2012-271465 (and English translation).
International Search Report mailed Nov. 13, 2012 in a related PCT application No. PCT/JP2012/005080 (with English translation).
Written Opinion of the International Searching Authority mailed Nov. 13, 2012 in a related PCT application No. PCT/JP2012/005080 (with English translation).
Written Opinion of the International Preliminary Examining Authority mailed Jun. 25, 2013 in a related PCT application No. PCT/JP2012/005080 (with English translation).
U.S. Appl. No. 14/127,713, filed Dec. 19, 2013, Sugiyama et al.
Office Action mailed Jul. 10, 2015 in the related co-pending U.S. Appl. No. 14/127,713.

* cited by examiner

FIG. 3
(a) 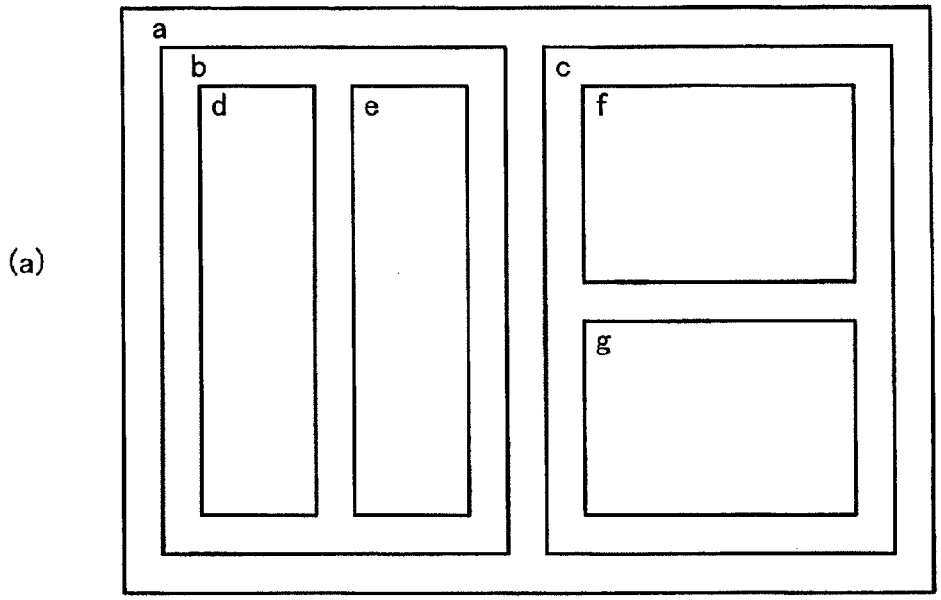
(b) 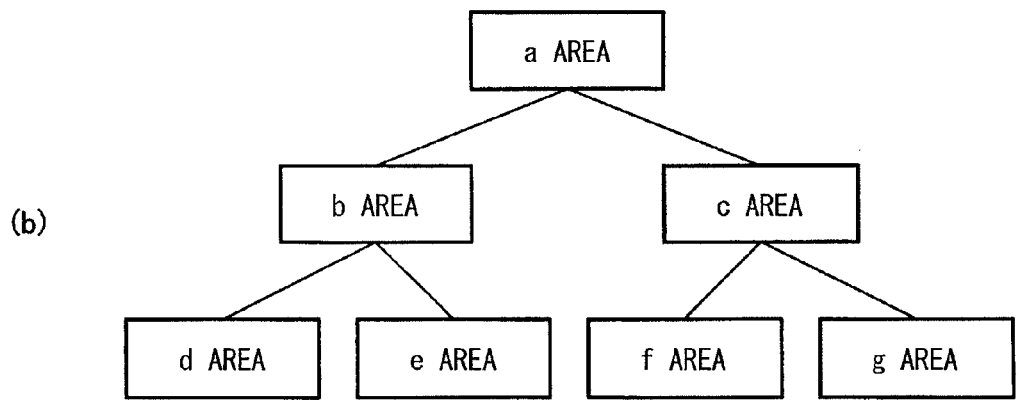
(c) 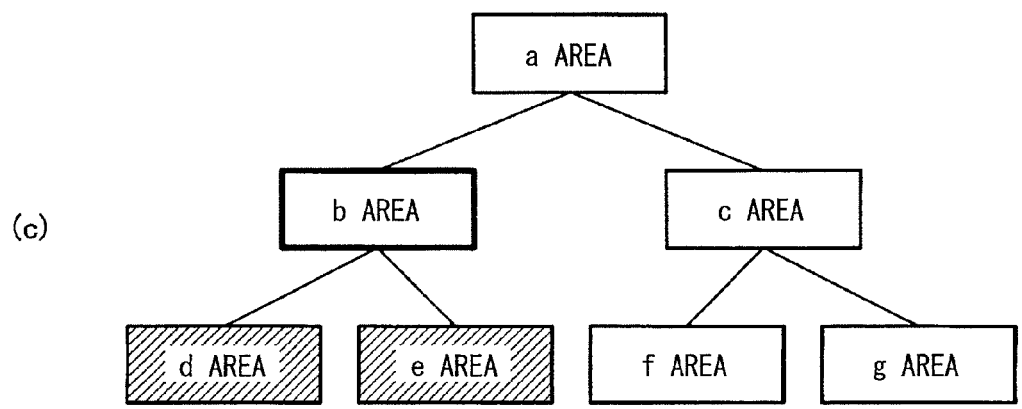

FIG. 7

(a) VISUAL LINE SUITABILITY TABLE

| AREA \ CONTENT | 1 | 2 | 3 | 4 | 5 |
|---|---|---|---|---|---|
| 1 | 10 | 8 | 6 | 4 | 2 |
| 2 | 9 | 10 | 8 | 6 | 4 |
| 3 | 8 | 9 | 10 | 8 | 6 |
| 4 | 7 | 8 | 9 | 10 | 8 |
| 5 | 6 | 7 | 8 | 9 | 10 |

(b) EXPRESSIVENESS SUITABILITY TABLE

| AREA \ CONTENT | 1 | 2 | 3 | 4 | 5 |
|---|---|---|---|---|---|
| 1 | 10 | 8 | 6 | 4 | 2 |
| 2 | 9 | 10 | 8 | 6 | 4 |
| 3 | 8 | 9 | 10 | 8 | 6 |
| 4 | 7 | 8 | 9 | 10 | 8 |
| 5 | 6 | 7 | 8 | 9 | 10 |

(c) OPERATION SUITABILITY TABLE

| AREA \ CONTENT | 1 | 2 | 3 | 4 | 5 |
|---|---|---|---|---|---|
| 1 | 10 | 0 | 0 | 0 | 0 |
| 2 | 9 | 10 | 8 | 6 | 4 |
| 3 | 8 | 9 | 10 | 8 | 6 |
| 4 | 7 | 8 | 9 | 10 | 8 |
| 5 | 6 | 7 | 8 | 9 | 10 |

FIG. 8
(a)
| X | Y | & | \| | ^ | / | + |
|---|---|---|---|---|---|---|
| 0 | 0 | 0 | 0 | 0 | 1 | 1 |
| 0 | 1 | 0 | 1 | 1 | 1 | 0 |
| 1 | 0 | 0 | 1 | 1 | 1 | 0 |
| 1 | 1 | 1 | 1 | 0 | 0 | 1 |
(b) 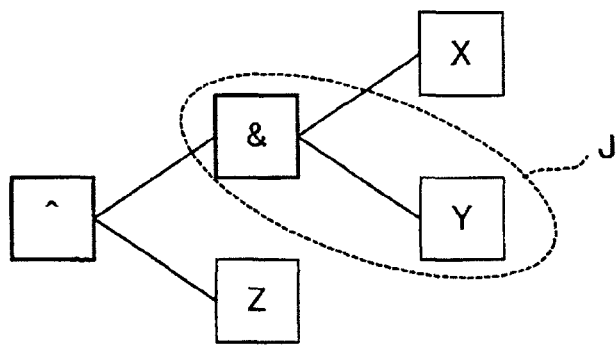
(c) 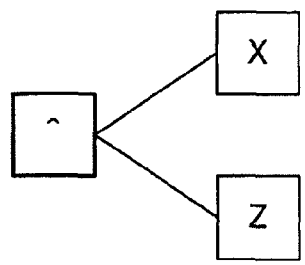
(d) 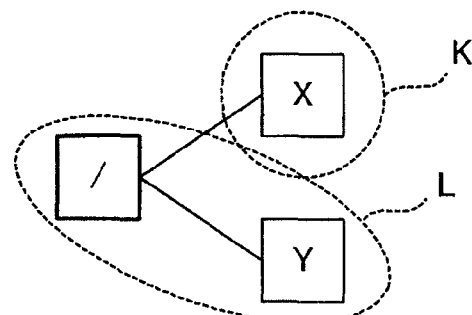

FIG. 15

| NAME | INFO VALUE | | SIZE (WxH) |
|---|---|---|---|
| | INITIAL VALUE | CHANGED VALUE | |
| NIGHT VIEW | 130 | - | 400x250 |
| LARGE GADGET | 120 | 0<br>* IN RUNNING | 400x250 |
| SPEED (METER) | 110 | - | 700x360 |
| SPEED (HUD) | 100 | - | 200x300 |
| LANE/TURN-BY-TURN | 95 | - | 140x120 |
| TACHOMETER | 90 | - | 162x360 |
| ACC | 85 | - | 235x190 |
| SHIFT POSITION | 70 | - | 100x55 |
| FUEL GAUGE | 65 | - | 162x360 |
| OUTSIDE AIR TEMPERATURE | 60 | - | 100x55 |
| ODOMETER | 55 | - | 160x55 |
| SMALL GADGET | 50 | - | 200x130 |
| SMALL MAIL | 50 | - | 100x60 |
| LARGE MAIL | 50 | - | 300x200 |
| ENERGY FLOW | 35 | - | 235x190 |

FIG. 16
(a)
BEFORE TRANSITION
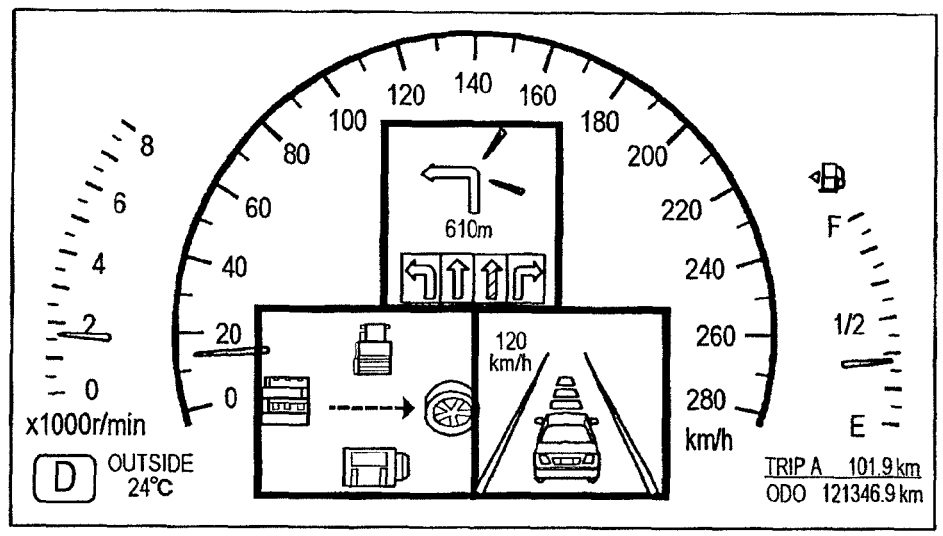
(b)
AFTER TRANSITION
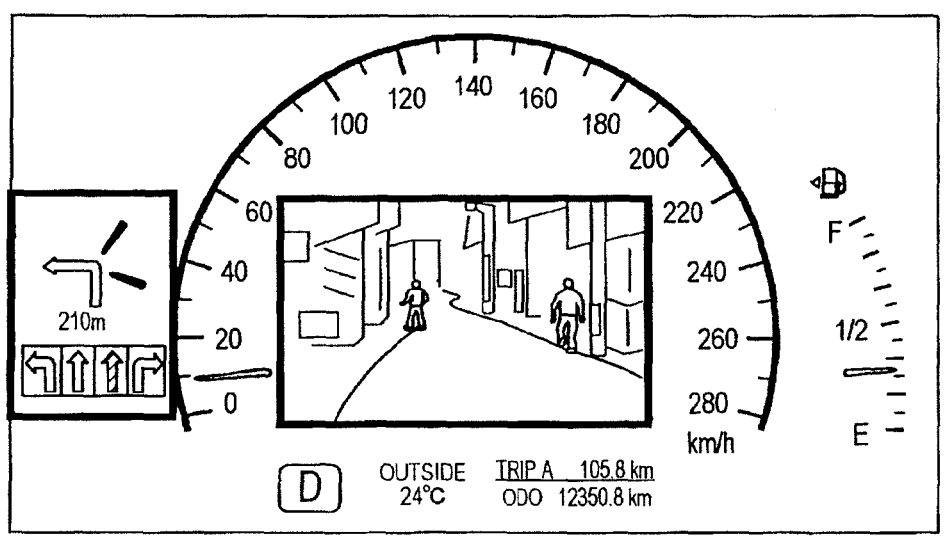

FIG. 17

| PRIORITY HIGH ↑ | NIGHT VIEW | 130 |
|---|---|---|
| | LANE/TURN-BY-TURN | 95 |
| | TACHOMETER | 90 |
| | ACC | 85 |
| PRIORITY LOW | ENERGY FLOW | 80 |

FIG. 19
| PRIORITY HIGH ↑ | NIGHT VIEW | ○ |
| --- | --- | --- |
| | LANE/TURN-BY-TURN | ○ |
| | SPEED (HUD) | ○ |
| PRIORITY LOW | ENERGY FLOW | × |
FIG. 20
(a)
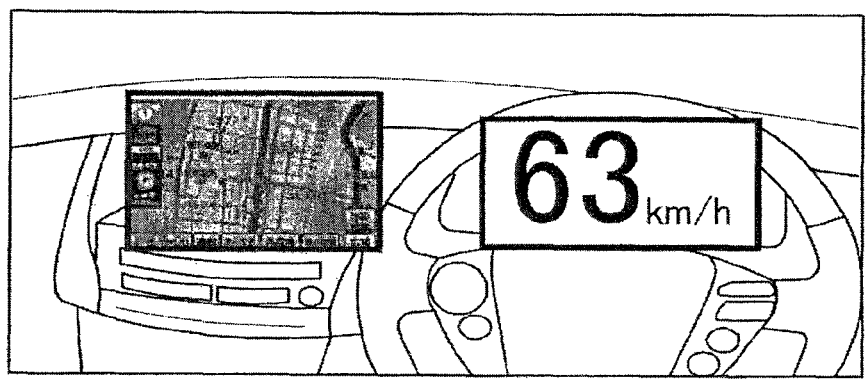
(b)
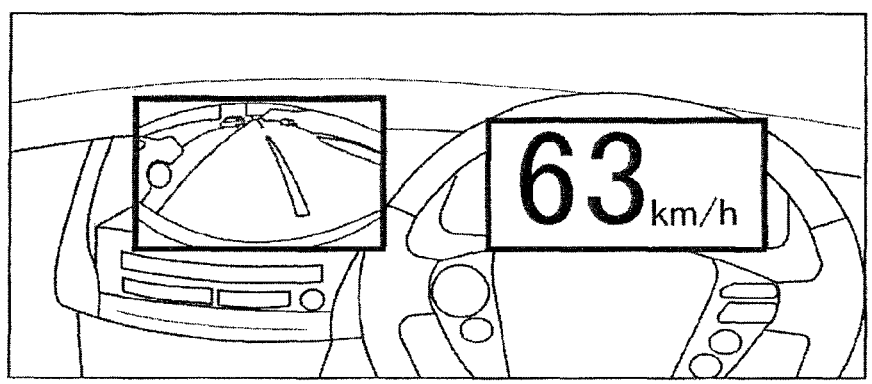

FIG. 21
(a)
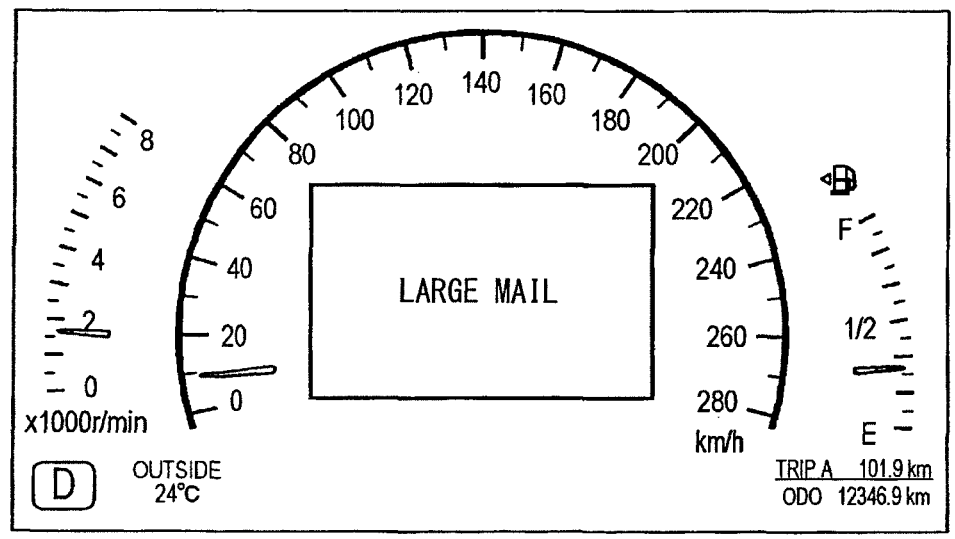
(b)
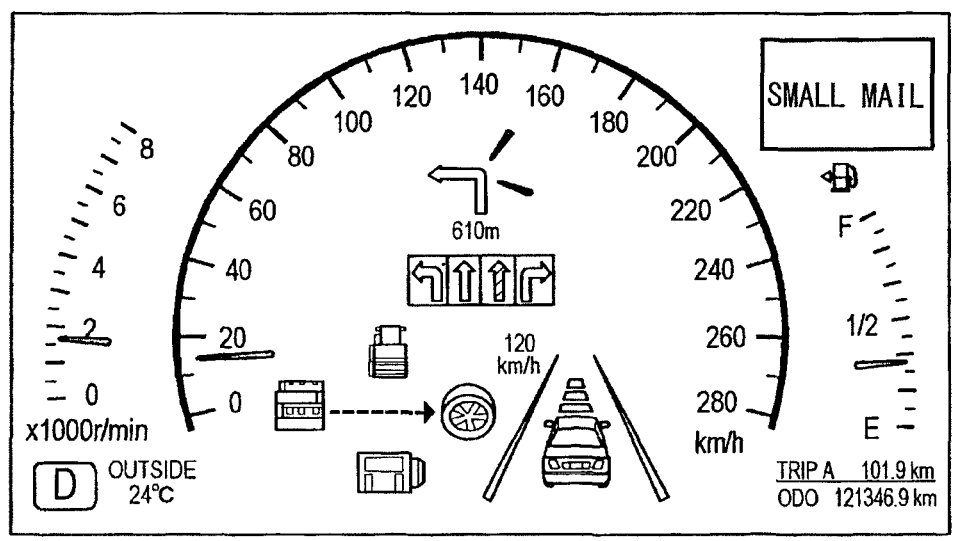

FIG. 22
(a)
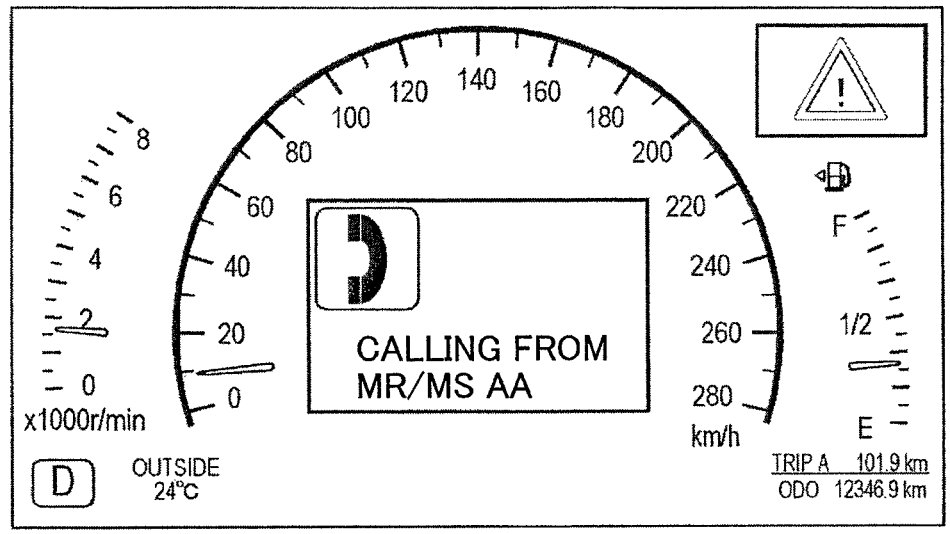
(b)
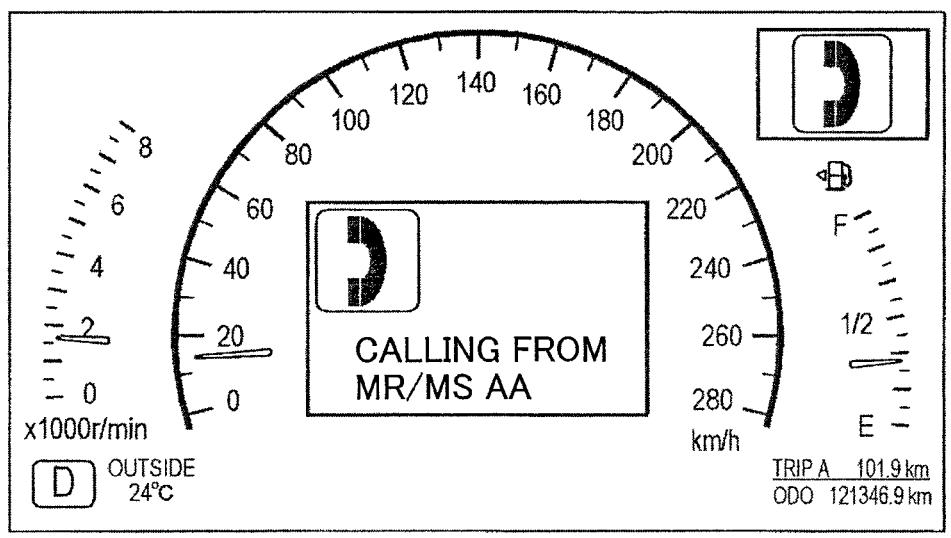

FIG. 23
(a)
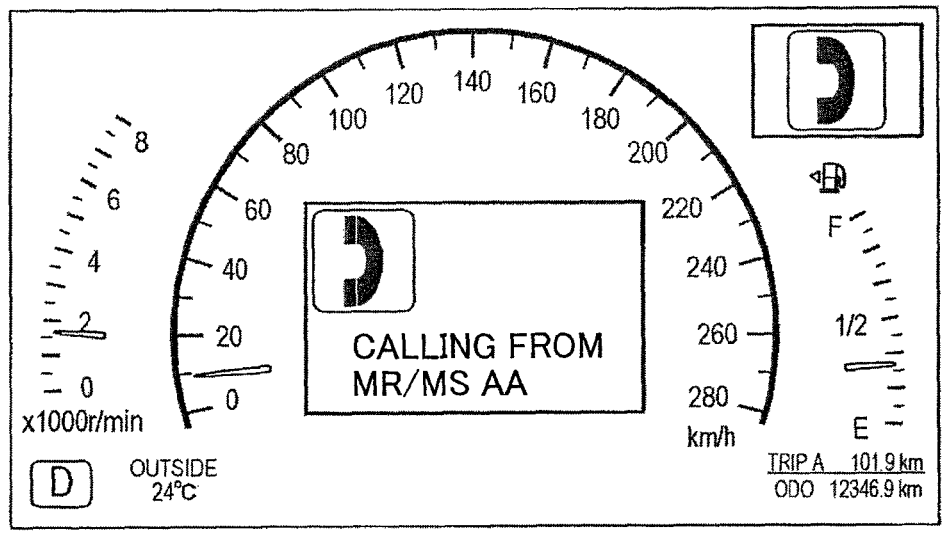
(b)
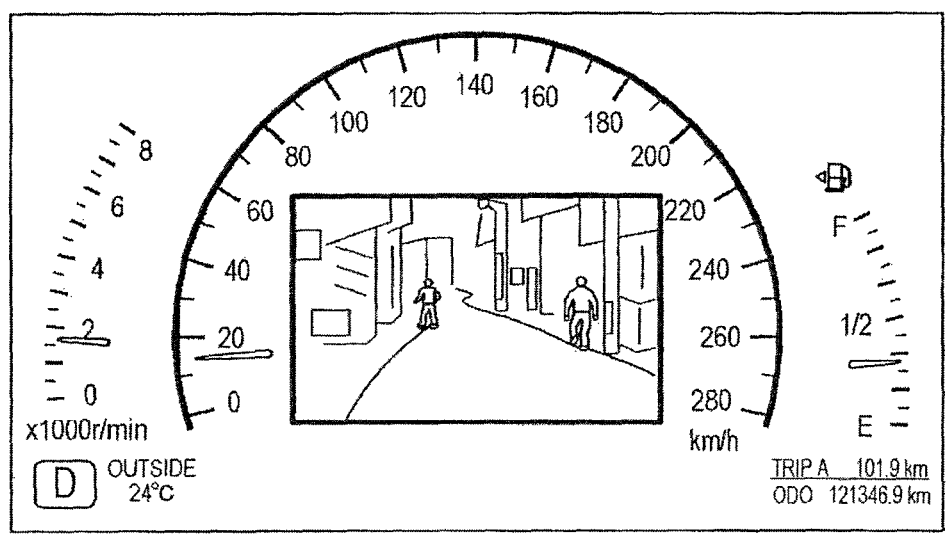

FIG. 24
(a)
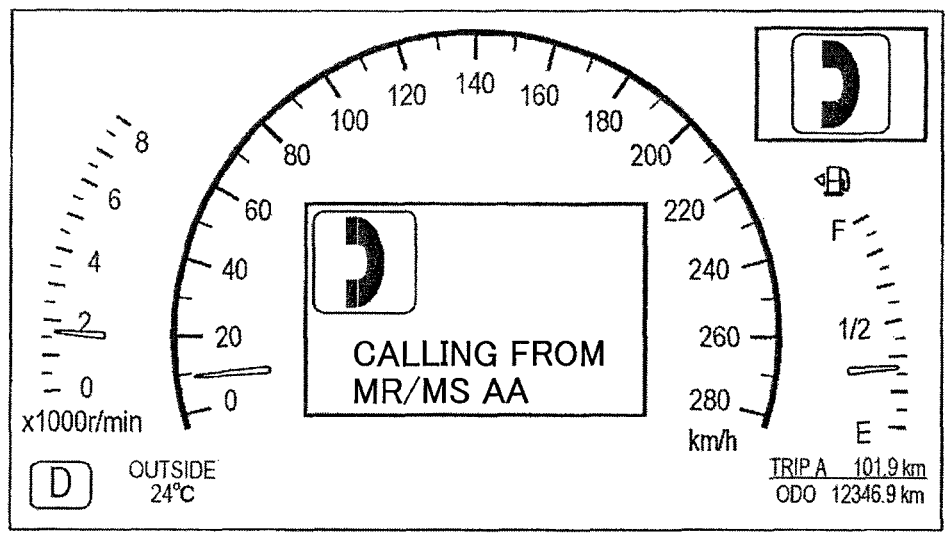
(b)
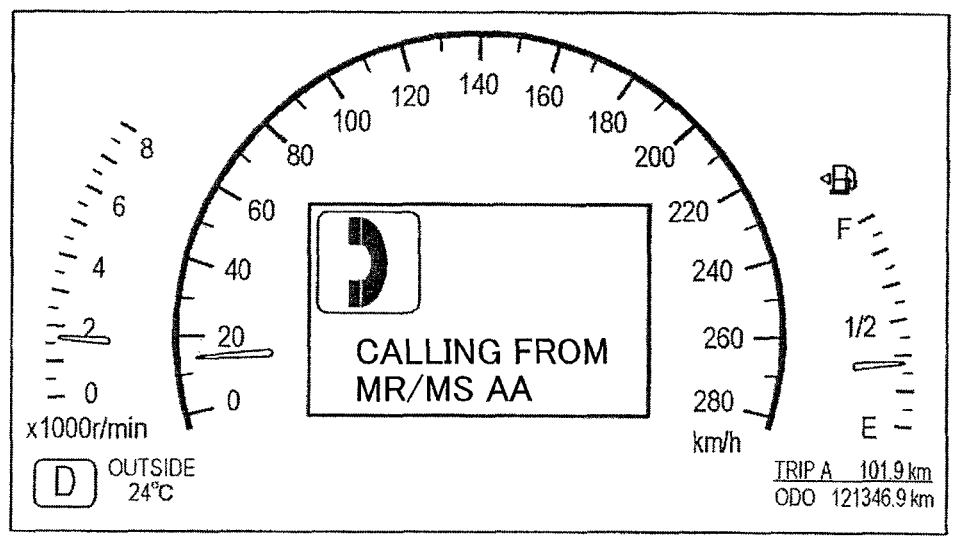

FIG. 25
(a)
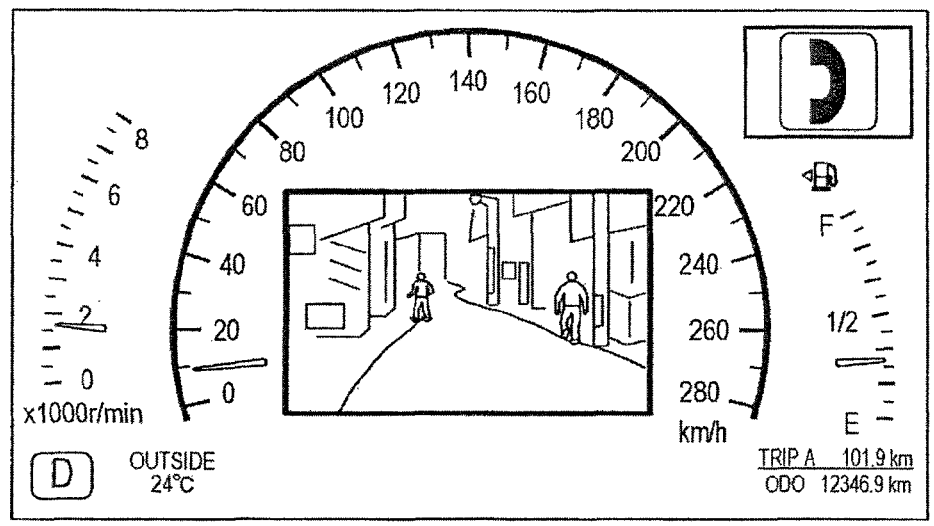
(b)
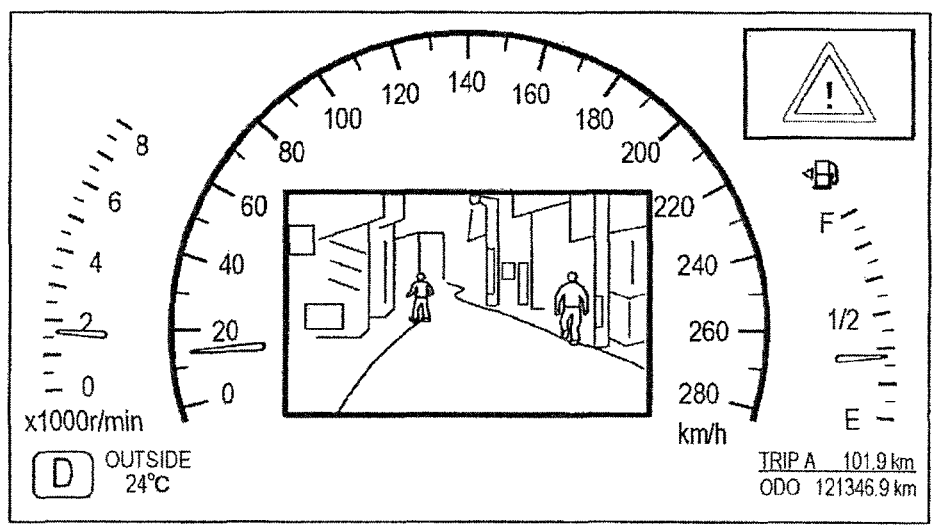

DISPLAY CONTROL APPARATUS

CROSS REFERENCE TO RELATED APPLICATIONS

The present application is a U.S. national stage application of International Patent Application No. PCT/JP2012/005079 filed on Aug. 9, 2012 , which claims priority from Japanese patent applications No. 2011-176033 filed on Aug. 11, 2011 , No. 2011-196098 filed on Sept. 8, 2011 , No. 2011-288063 filed on Dec. 28, 2011 , No. 2011-288064 filed on Dec. 28, 2011 , No. 2012-164976 filed on Jul. 25, 2012 , No. 2012-164977 filed on Jul. 25, 2012 , No. 2012-176321 filed on Aug. 8, 2012 , and No. 2012-176322 filed on Aug. 8, 2012 , the contents of which are hereby incorporated by reference into this application.

TECHNICAL FIELD

The present disclosure relates to a technology to display vehicular information on a display apparatus provided in a vehicle compartment so that users can easily understand the displayed information.

BACKGROUND ART

Varieties of information are provided in a vehicle compartment. For example, the information includes vehicle states such as a vehicle speed, an engine speed, a shift position, fuel, and water temperature. The other information includes a map for navigation, air conditioner setting information, and audio information. Recently, the provided information includes night views for driving assistance and information about a mobile terminal carried into the vehicle.

Varieties of display apparatuses are mounted to provide these kinds of information. The display apparatuses include a head-up display and a liquid crystal display to display maps, for navigation. Some types of meter panels to display vehicle speeds use liquid crystal displays to provide varieties of information and may be categorized as display apparatuses.

There is a tendency for increasing the information (hereinafter referred to as a content) to be provided and for mounting multiple display apparatuses. Therefore, it is important to determine which content needs to be displayed on which region (hereinafter referred to as an area) of which display apparatus.

According to the related art, there is disclosed the technology to assign multiple screen data generated from a mobile terminal to one display (e.g., see Patent Document 1). This technology assigns priorities to the screen data and display areas and determines the areas according to the priorities.

However, the technology described in Patent Document 1 disables flexible arrangement of contents.

Content-area combinations may or may not conform to each other.

Specifically, content A conforms to area A but content B does not conform to area A. The technology described in Patent Document 1 displays a less valued content in a highly prioritized area if that content is highly prioritized in contents to be displayed. As a result, the content may be displayed in an inappropriate area.

PRIOR ART LITERATURE

Patent Literature

Patent Document 1: Japanese Unexamined Patent Application Publication No. 2009-140488 (corresponding to U.S. Patent Application Publication No. 20100117810)

SUMMARY OF THE INVENTION

The present disclosure has been made in consideration of the foregoing. A first object of the disclosure is to enable flexible arrangement of contents. A second object of the disclosure is to provide a display control apparatus capable of arranging contents in appropriate areas and displaying information so that users can easily understand the displayed information.

According to a first example of the present disclosure, there is provided a display control apparatus that assigns display target contents to a plurality of areas configured as display areas in a screen of a display apparatus mounted on a vehicle. The display control apparatus comprises: a content management portion that manages the contents in association with respective content information indicating attributes of the contents; an area management portion that manages the areas in association with respective area information indicating attributes of the areas; and a content assignment control portion that generates a content list listing the contents and determines combinations of the contents and the areas based on the content information and the area information in an order of the content list.

The display control apparatus can enable flexible arrangement of contents.

According to a second example of the present disclosure, there is provided a display control apparatus that assigns display target contents to a plurality of areas configured as display areas in a screen of a display apparatus mounted on a vehicle, the display control apparatus comprising: a content parameter provided for each content, the content parameter including, at least one of a content evaluation value indicating display priority of the content and a content size indicating display size of the content; an area parameter provided for each area, the area parameter including at least one of an area evaluation value indicating assignment priority of the area and an area size indicating display size of the area; and a content assignment control portion that determines an order of assigning the contents to the areas based on the content parameters, in the determined order, make a determination of whether there is an available area capable of displaying the content based on relation between the content parameter and the area parameter, and based on results of the determination, sequentially determines combinations of the contents and the areas.

The display control apparatus can arrange contents in appropriate areas and display information so that users can easily understand the displayed information.

According to a third example of the present disclosure, there is provided a display control apparatus that assigns display target contents to a plurality of areas configured as display areas in screens of display apparatuses, the display control apparatus comprising: a content management portion that manages content information indicating an attribute of each content; an area management portion that manages area information indicating an attribute of each area; and a content assignment control portion that, based on the content information and the area information from the content management portion and the area management portion, evaluates a content evaluation value representing value of displaying the content on the area and an area parameter representing suitability of assigning the content to the area, and determines combinations of the contents and the areas based on a result of the evaluating.

The display control apparatus can arrange contents in appropriate areas and display information so that users can easily understand the displayed information.

BRIEF DESCRIPTION OF DRAWINGS

The foregoing and other advantages and features of the disclosure will become more apparent from the detailed description given below with reference to the accompanying drawings in which:

FIG. 2($b$) is an explanatory diagram illustrating content-area correspondence relation;

FIG. 2($c$) is an explanatory diagram illustrating content assignment based on attributes;

FIGS. 3($a$) through 3($c$) are explanatory diagrams illustrating hierarchical data structures of areas in an area management portion;

FIG. 7($a$) is an explanatory diagram illustrating a visual line suitability table;

FIG. 7($b$) is an explanatory diagram illustrating an expressiveness suitability table;

FIG. 7($c$) is an explanatory diagram illustrating an operation suitability table;

FIGS. 8($a$) through 8($d$) are explanatory diagrams illustrating processes of indispensable exclusion constraint expressions using predetermined operators;

FIG. 15 is an explanatory diagram illustrating contents assigned to the areas in the meter panel and the head-up display;

FIGS. 16($a$) and 16($b$) are explanatory diagrams illustrating screen transition in the meter panel;

FIG. 17 is an explanatory diagram illustrating content priorities;

FIG. 19 is an explanatory diagram illustrating content priorities and the display apparatus;

FIGS. 20($a$) and 20($b$) are explanatory diagrams illustrating content assignment using evaluation values;

FIGS. 21($a$) and 21($b$) are explanatory diagrams illustrating indispensable display of mail contents;

FIGS. 22($a$) and 22($b$) are explanatory diagrams illustrating content assignment using indispensable exclusion constraint expressions;

FIGS. 23($a$) and 23($b$) are explanatory diagrams illustrating content assignment using indispensable exclusion constraint expressions;

FIGS. 24($a$) and 24($b$) are explanatory diagrams illustrating content assignment using indispensable exclusion constraint expressions; and FIGS. 25($a$) and 25($b$) are explanatory diagrams illustrating content assignment using indispensable exclusion constraint expressions.

MODE FOR CARRYING OUT THE INVENTION

Figure 1:
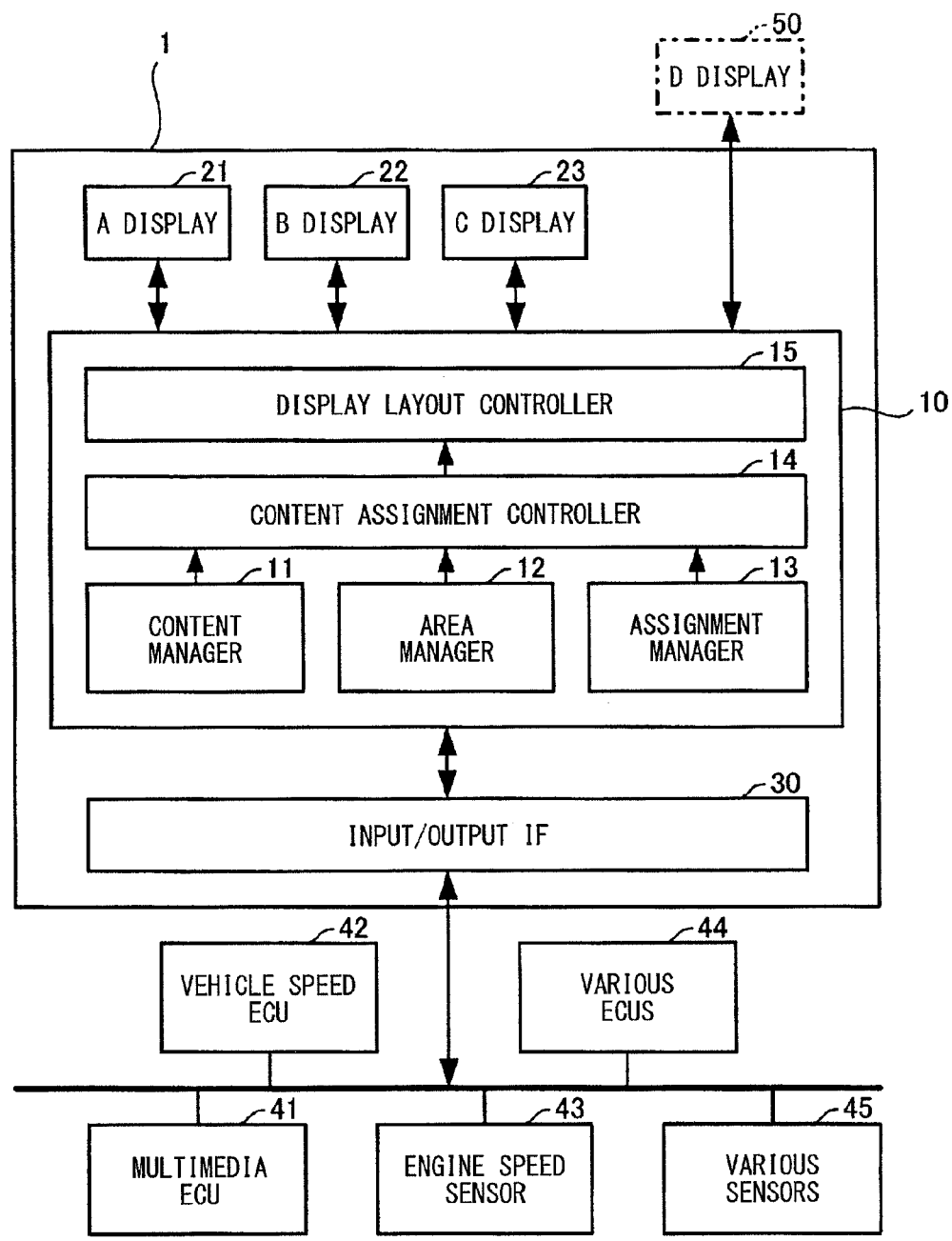
FIG. 1 is a block diagram schematically illustrating a configuration of a display control apparatus.

Embodiments of the present disclosure will be described in further detail with reference to the accompanying drawings.
(First Embodiment)
FIG. 1 is a block diagram schematically illustrating a configuration of a display control apparatus 1 according to an embodiment.

The display control apparatus 1 includes a control portion 10 as a major component. The control portion 10 connects with three display apparatuses 21, 22, and 23, and an input/output IF 30. For the purpose of distinction, the three display apparatuses 21, 22, and 23 may be termed "A display apparatus 21," "B display apparatus 22," and "C display apparatus 23" as needed in the description below.

The three display apparatuses, the A display apparatus 21, the B display apparatus 22, and the C display apparatus 23, are respectively embodied as a head-up display, a meter panel, and a liquid crystal display apparatus to display maps for navigation, for example. However, the display apparatuses are not limited thereto.

The input/output IF 30 enables connection to an in-vehicle network (e.g., CAN). Via the input/output IF 30, the display control apparatus 1 is connected to a multimedia ECU 41, a vehicle speed ECU 42, an engine speed sensor 43, various ECUs 44, and various sensors 46. The various ECUs 44 include a navigation ECU, for example. The various sensors 45 include an outside air temperature sensor to detect the temperature outside the vehicle compartment and a water temperature sensor to detect the coolant temperature.

This configuration enables the display control apparatus 1 to acquire various contents via the network. Various contents include "audio information" acquired from the multimedia ECU 41, "vehicle speed" acquired from the vehicle speed ECU 42, "engine speed" acquired from the engine speed sensor 43, "map" acquired from the navigation ECU included in the various ECUs 44, and "outside air temperature" acquired from the outside air temperature sensor included in the various sensors 45.

The control portion 10 includes a content management portion 11, an area management portion 12, an assignment management portion 13, a content assignment control portion 14, and a display layout control portion 15.

Figure 2:
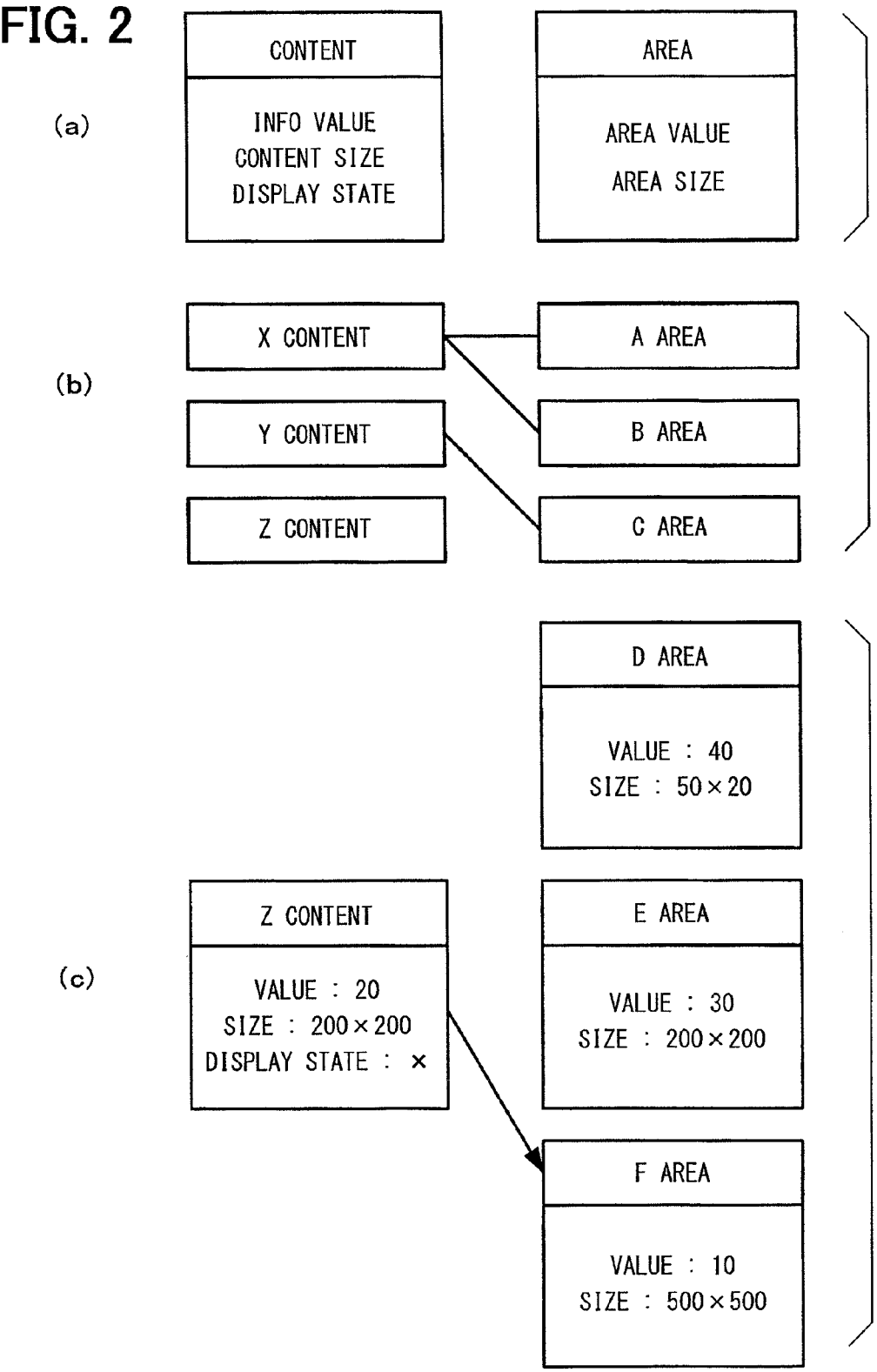
FIG. 2($a$) is an explanatory diagram illustrating attributes associated with contents and areas according to a first embodiment.

The content management portion 11 manages various contents including those belonging to different categories. The content management portion 11 includes a storage device (storage portion) to store three attributes (parameters) such as "information value," "content size," and "display state" associated with each content as illustrated in FIG. 2(a).

The information value denotes the content importance. Generally, great information value is attached to an urgent content such as "warning information". Next smaller information value is attached to contents concerning running conditions such as "vehicle speed" and "engine speed." Relatively lithe information value is attached to contents such as "map" for navigation and "audio information."

The content size concerns size of an area needed to display contents. The content size is represented as the number of vertical and horizontal pixels, for example.

The display state provides flag information indicating whether the content is to be displayed or not. The display state is set to be "active" indicating that the content is to be displayed or "inactive" indicating that the content is not to be displayed.

Specifically, contents are "activated" or "inactivated" depending on vehicle situations or user operations. For example, setting the shift pattern to R "activates" the "back monitor" content based on information captured by a rear view camera. Setting the shift pattern otherwise "inactivates" the "back monitor" content. Turning on an audio switch "activates" the "audio information" content on an audio control panel. Turning off the audio switch "inactivates" the "audio information" content.

The area management portion 12 manages multiple areas as display areas. The areas according to the embodiment are provided for screens of the three display apparatuses, that is, the A display apparatus 21 through the C display apparatus 23. The area management portion 12 similarly manages the areas for the three display apparatuses, that is, the A display apparatus 21 through the C display apparatus 23. The area management portion 12 equally manages areas for the A display apparatus 21 and those for the B display apparatus 22. The area management portion 12 according to the embodiment includes a storage device (storage portion) to store two attributes (parameters) such as "area value" and "area size" linked to each area, as illustrated in FIG. 2(a).

The area value denotes area importance. Generally, great area value is attached to a highly visible area. For example, great area value is attached to an area of the head-up display using a windshield.

Similarly to the content size, the area size concerns an area and is represented by the number of vertical and horizontal pixels, for example.

The area management portion 12 manages areas for the A display apparatus 21 through the C display apparatus 23 according to a hierarchical data structure. In other words, the area management portion 12 uses display screens of the display apparatuses 21 through 23 as a single area or divided display areas. For this purpose, the area management portion 12 includes a storage device (storage portion) to store variables indicating hierarchical structure relation among areas. FIG. 3 illustrates areas for the A display apparatus 21. The display screen of the A display apparatus 21 can provide display areas a through g. The above-mentioned storage device stores inclusion relation among the areas. The inclusion relation is referenced when a combination of contents and areas is extracted. An area included in the already allocated area is excluded from candidate areas to which contents may be assigned.

FIG. 3(a) illustrates display areas for the A display apparatus 21. Area a uses the entire screen. Area a is vertically divided into two areas b and c.

Area b is further vertically divided into two areas d and e. Area c is horizontally divided into two areas f and g.

As illustrated in FIG. 3(a), the area management portion 12 manages area a as an area belonging to the highest hierarchy. The area management portion 12 manages areas b and c in a hierarchy immediately below area a.

The area management portion 12 manages areas d, e, f, and g in a hierarchy immediately below areas b and c.

For example, when a content is assigned to area b as illustrated in FIG. 3(c), the area management portion 12 determines that areas d and e belonging to the lower hierarchy are unavailable. When content is assigned to only area b, which is one of areas b and c immediately below area a (when areas c, f, and g are not used), it is sufficient to display the content in area a. For example, the content may be centered over areas b and c.

The embodiment provides the content management portion 11 and the area management portion 12 as described above. The content assignment control portion 14 compares the information value of the content with the area value of the area. The content assignment control portion 14 assigns a content to the area only when the information value of the content is greater than the area value of the area. In the description below, the information value and the area value are generically termed "value" and the content size and the area size are generically termed "size" as needed.

The content assignment control portion 14 assigns a content to an area in consideration of "size" as well as "value" of the content and the area. When contents are assigned to areas, the display layout control portion 15 displays the contents on the areas.

A content is "dynamically assigned" to an area based on content and area attributes. By contrast, some contents are assigned to predetermined areas. This is "static assignment." The assignment management portion 13 manages the predetermined content-area correspondence relation.

As illustrated in FIG. 2(a), for example, the assignment management portion 13 maintains correspondence relation between content X and areas A and B. In this case, content X is assigned to area A or B. The assignment management portion 13 maintains correspondence relation between content Y and area C. In this case, content Y is assigned to area C.

Figure 4:
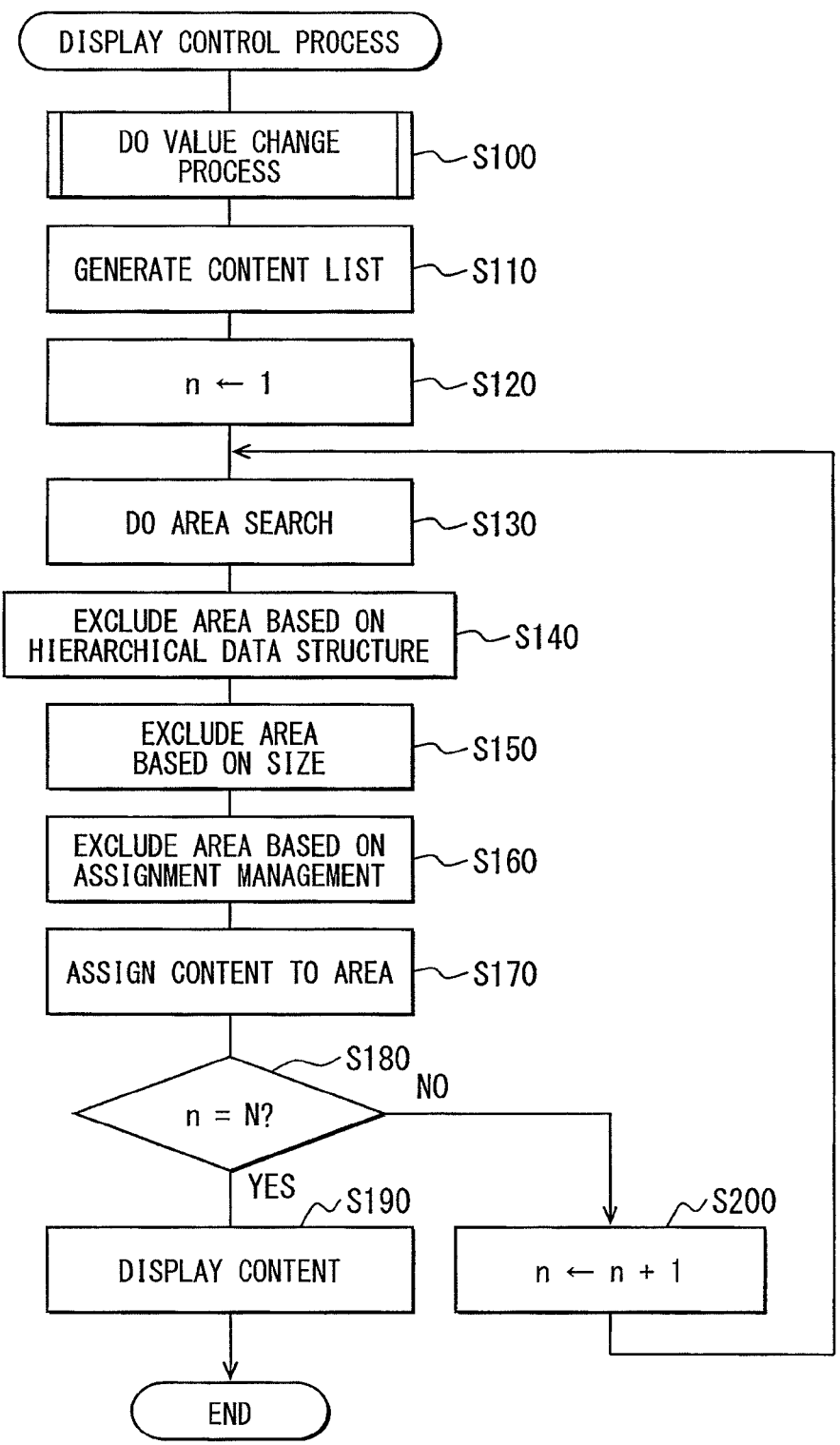
FIG. 4 is a flowchart illustrating a display control process according to a first embodiment.

A process for display control will be more specifically described. FIG. 4 is a flowchart illustrating a display control process. The display control process is repeatedly performed while an ignition switch is turned on.

The value change process is performed at S100. This process changes the information value of a content and the area value of an area based on a vehicle situation (in the embodiment, a running situation indicating whether the vehicle is running or stopped).

At S110, the display control process generates a content list. The process extracts contents whose attributes, that is, the display states, are "active" and sorts the contents in descending order of the information value. This example assumes that as many as N contents are sorted.

At S120, the display control process initializes variable n indicating a content to "1." The display control process processes the first content, the second content, the third content, and so on each time variable n is incremented.

At S130, the display control process searches for areas. The display control process searches for all areas to which no contents have not been assigned yet.

At S140, the display control process excludes an area based on the hierarchical data structure. Even when a certain area is assigned no content, the display control process excludes the certain area if a content is assigned to an area located higher than the certain area in the hierarchical data structure. As illustrated in FIG. 3(c), for example, when a content is assigned to area b, the display control process excludes areas d and e.

At S150, the display control process excludes an area based on the content size and the area size. The display control process excludes an area whose area size is smaller than the content size of a content to be assigned.

As illustrated in FIG. 2(c), for example, content Z has the content size of "200×200." Assigning content Z excludes area D whose area size is "50×20."

At S160, the display control process excludes an area based on assignment management. Specifically, the display control process excludes an area outside the content-area correspondence relation based on the correspondence relation stored in the assignment management portion 13.

At S170, the display control process assigns a content to an area.

The display control process assigns a content to an area that belongs to areas selected up to S160, has the area value less than the information value of the content, and indicates the greatest area value. As illustrated in FIG. 2(c), content Z has information value of "20" and is therefore assigned to area F whose area value is "10" less than the information value of "20" for content Z.

At S180, the display control process determines whether variable n equals content count N. The display control process determines whether all contents have been processed. If the result is n=N (YES at S180), the display control process proceeds to S190. If the result is n≠N (NO at S180), an unprocessed content remains. At S200, the display control process increments variable n and repeats the process from S130.

At S190, the display control process displays the content. The display control process displays the content in the assigned area.

Figure 5:
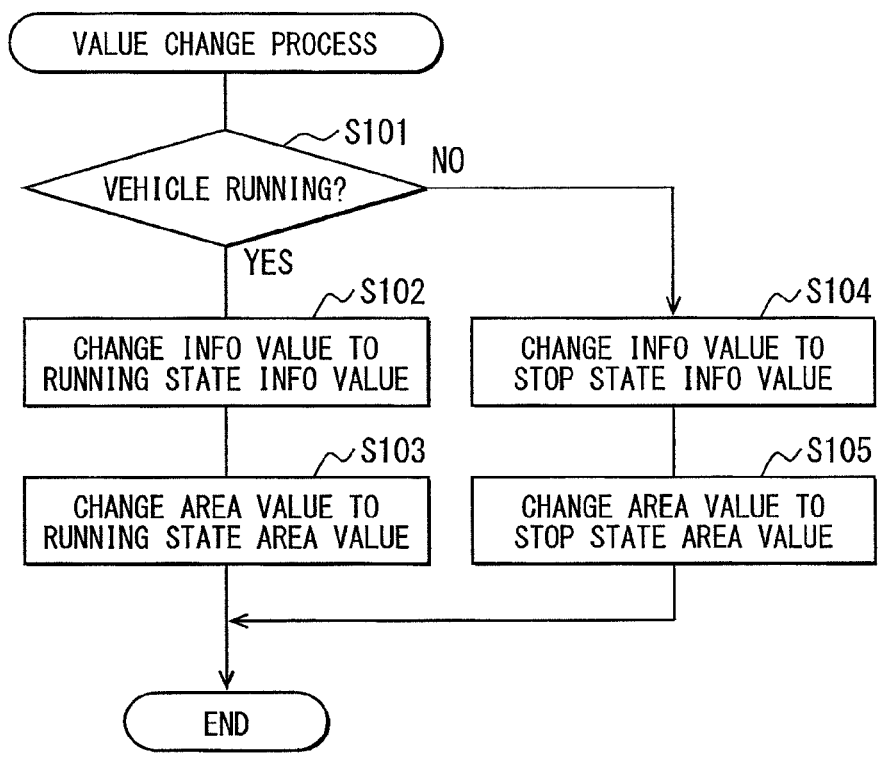
FIG. 5 is a flowchart illustrating a value change process.

The value change process at S100 in FIG. 4 will be described. FIG. 5 is a flowchart illustrating the value change process.

At S101, the value change process determines whether a vehicle is running. The determination is performed based on a "vehicle speed" transmitted from the vehicle speed ECU 42. If the determination result indicates that the vehicle is running (YES at S101), the value change process proceeds to S102 and changes the information value of the content to the information value for the running state. At S103, the value change process changes the information value of the area to the area value for the running state and then terminates. If the determination result indicates that the vehicle is not running (NO at S101) or the vehicle is stopped, the value change process proceeds to S104 and changes the information value of the content to the information value for the stop state. At S105, the value change process changes the information value of the area to the area value for the stop state and then terminates.

The information value of content is predetermined for the running state and the stop state. The area value of areas is predetermined for the running state and the stop state. For example, contents acquired from the multimedia ECU 41 are less important in the running state than in the stop state. In terms of such contents, the information value for the running state is set to be less than the information value for the stop state. The running state may increase the importance of an area that minimizes the visual line movement. In terms of such areas, the area value for the running state is set to be greater than the area value for the stop state.

As described above, the area management portion 12 according to the embodiment manages areas for the A display apparatus 21 through the C display apparatus 23 according to a hierarchical data structure. For example, areas for the A display apparatus 21 are hierarchized as illustrated in FIG. 3.

Figure 12:
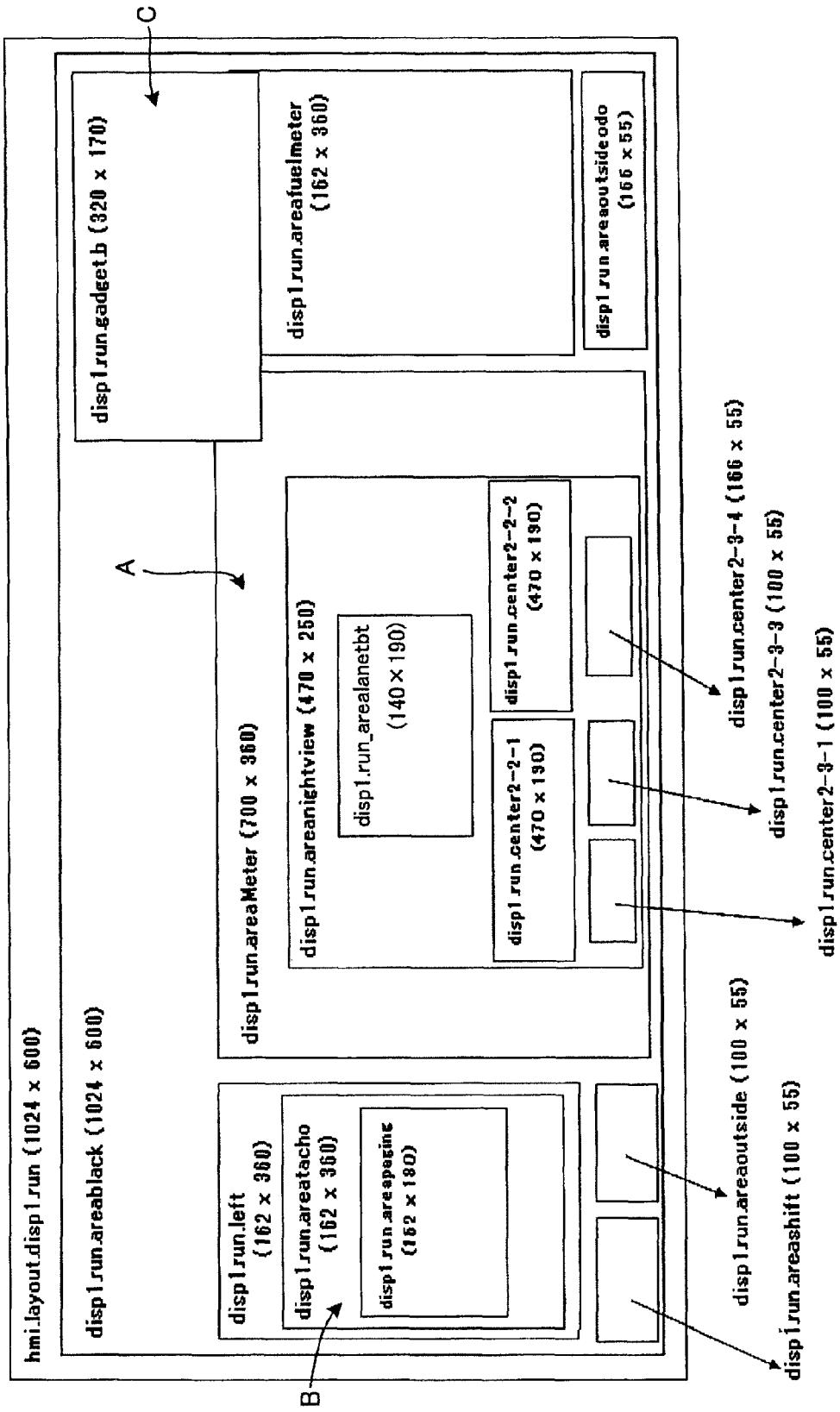
FIG. 12 is an explanatory diagram illustrating areas included in a meter panel.

More specifically, areas may be configured as illustrated in FIG. 12 for example when the A display apparatus 21 is available as a meter panel. As illustrated in FIG. 12, the meter panel includes a center area indicated by symbol A, a left area indicated by symbol B, and an upper right area indicated by symbol C. The center area is hierarchized and may be assigned multiple contents.

Figure 13:
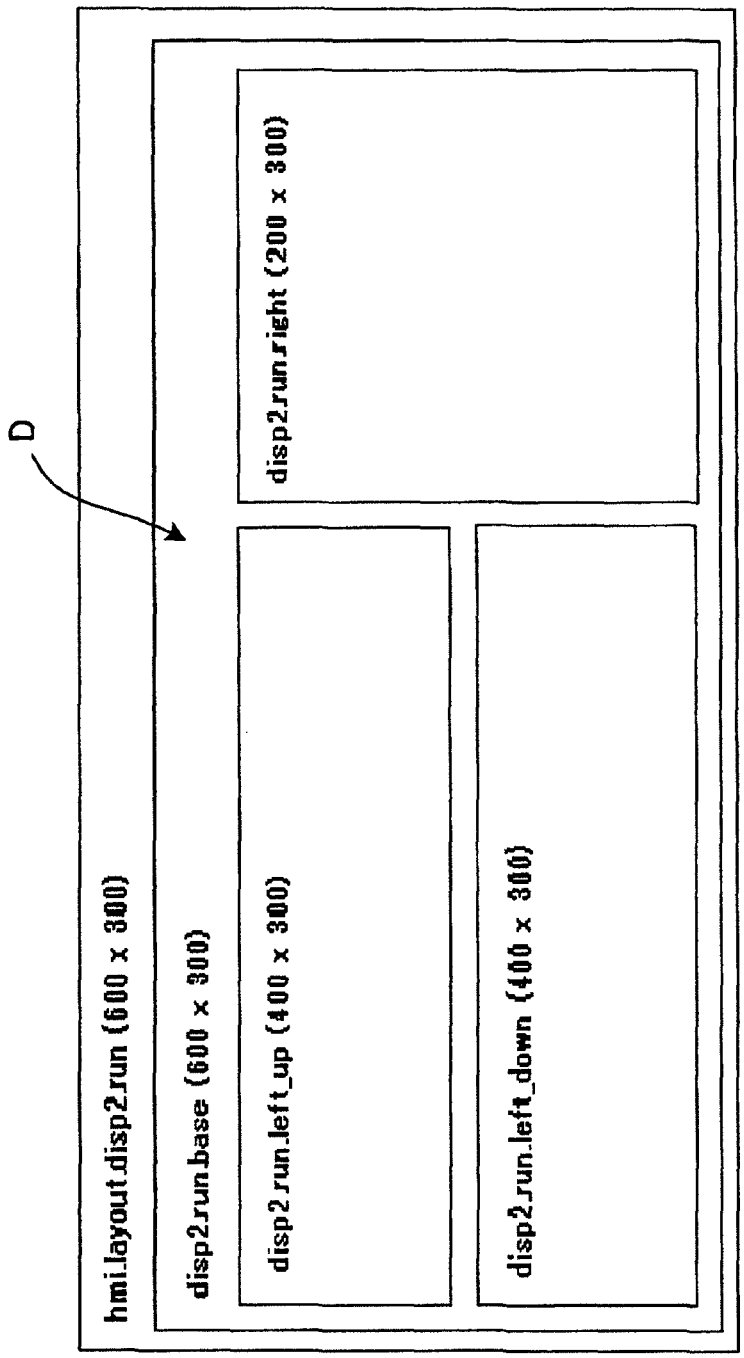
FIG. 13 is an explanatory diagram illustrating areas included in a head-up display.

Areas may be configured as illustrated in FIG. 13 for example when the B display apparatus 22 is available as a head-up display. The area indicated by symbol D is hierarchized and may be assigned multiple contents.

Figure 14:
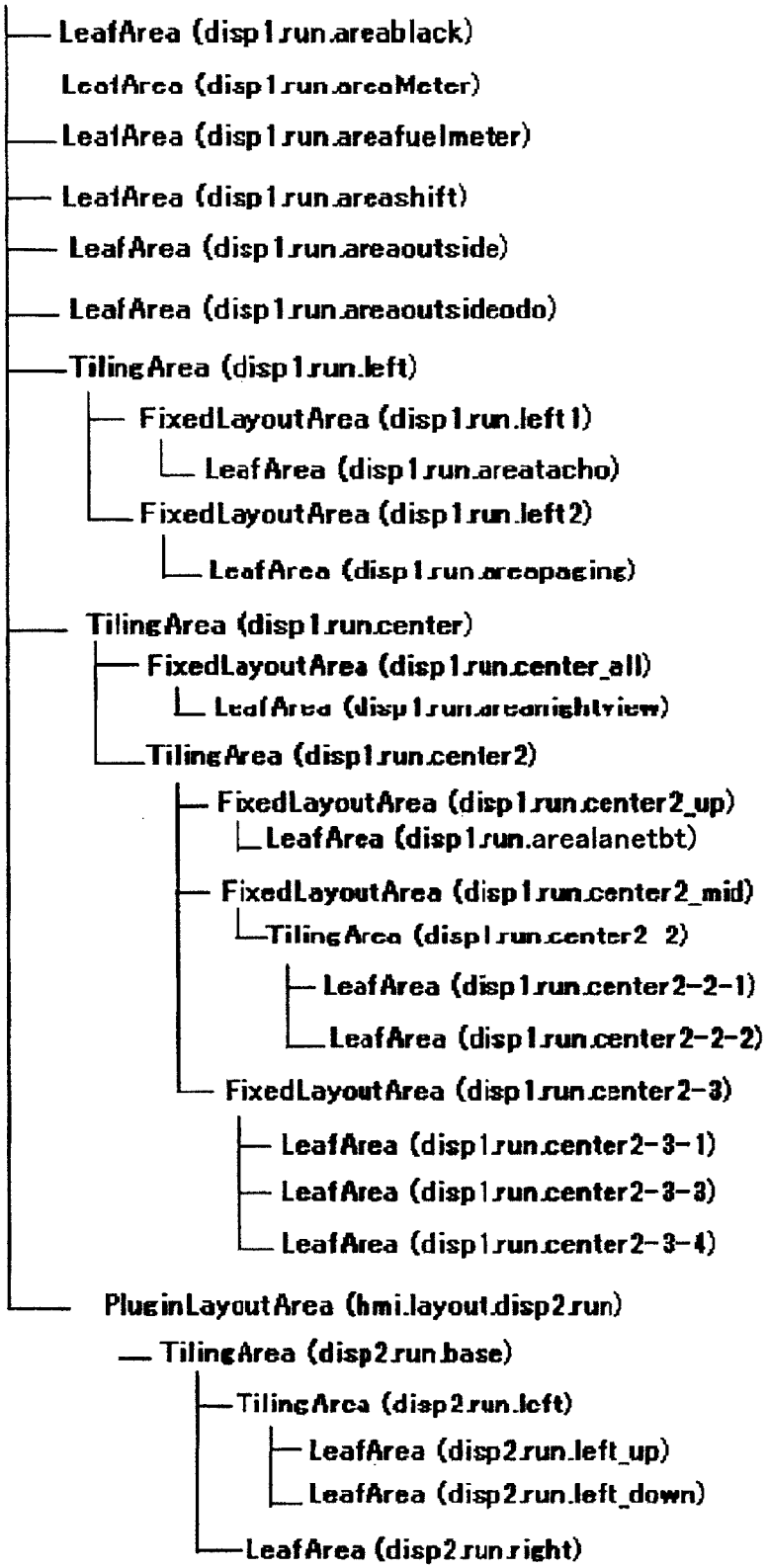
FIG. 14 is an explanatory diagram illustrating a hierarchical structure of areas in the meter panel and the head-up display.

FIG. 14 illustrates the hierarchical area structure in this case. Plugin Layout Area indicated, by a broken line in FIG. 14 is added as an additional hierarchical structure if the B display apparatus 22 as a head-up display is added later.

FIG. 15 illustrates contents assigned to the areas. The contents include "night view," "large gadget," "speed ("vehicle speed" displayed on the meter panel)," "speed ("vehicle speed" displayed on the head-up display)," "lane/turn-by-turn," "tachometer," "ACC (adaptive cruise control)," "energy flow," "shift position," "fuel gauge," "outside air temperature," "odometer," "notification," "small gadget," "small mail," and "large mail." Each content includes the information value and the content size associated with each other. When the vehicle is running, the information value of content "large gadget" is set to "0" (S102 in FIG. 5).

On assumption that the area value of areas exceeds the information value of contents, three contents "lane/turn-by-turn," "ACC," and "energy flow" are assigned to the center area of the meter panel in FIG. 16(a).

When there occurs a request to display "night view," the display control process generates a content list of contents in an order from a content having the great information value, so that the list of contents includes the active "night view" content (S110 in FIG. 4). Contents are assigned to the area in order from the beginning of the content list, that is, from a content having the great information value (S170).

As illustrated in FIG. 17, "night view" is given information value "130." "Lane/turn-by-turn" is given information value "95." "Tachometer" is given information value "90." "ACC" is given information value "85." "Energy flow" is given information value "80."

As illustrated in FIG. 16(b), the night view of information value "130" is preferentially assigned to the center area of the meter panel. The "lane/turn-by-turn" content is then pushed out by the "night view" content and is assigned to the left area of the meter panel. This is because the "lane/turn-by-turn" content has the information value greater than that of the "tachometer" content.

Then, suppose the B display apparatus 22 is later added as a head-up display.

Figure 18:
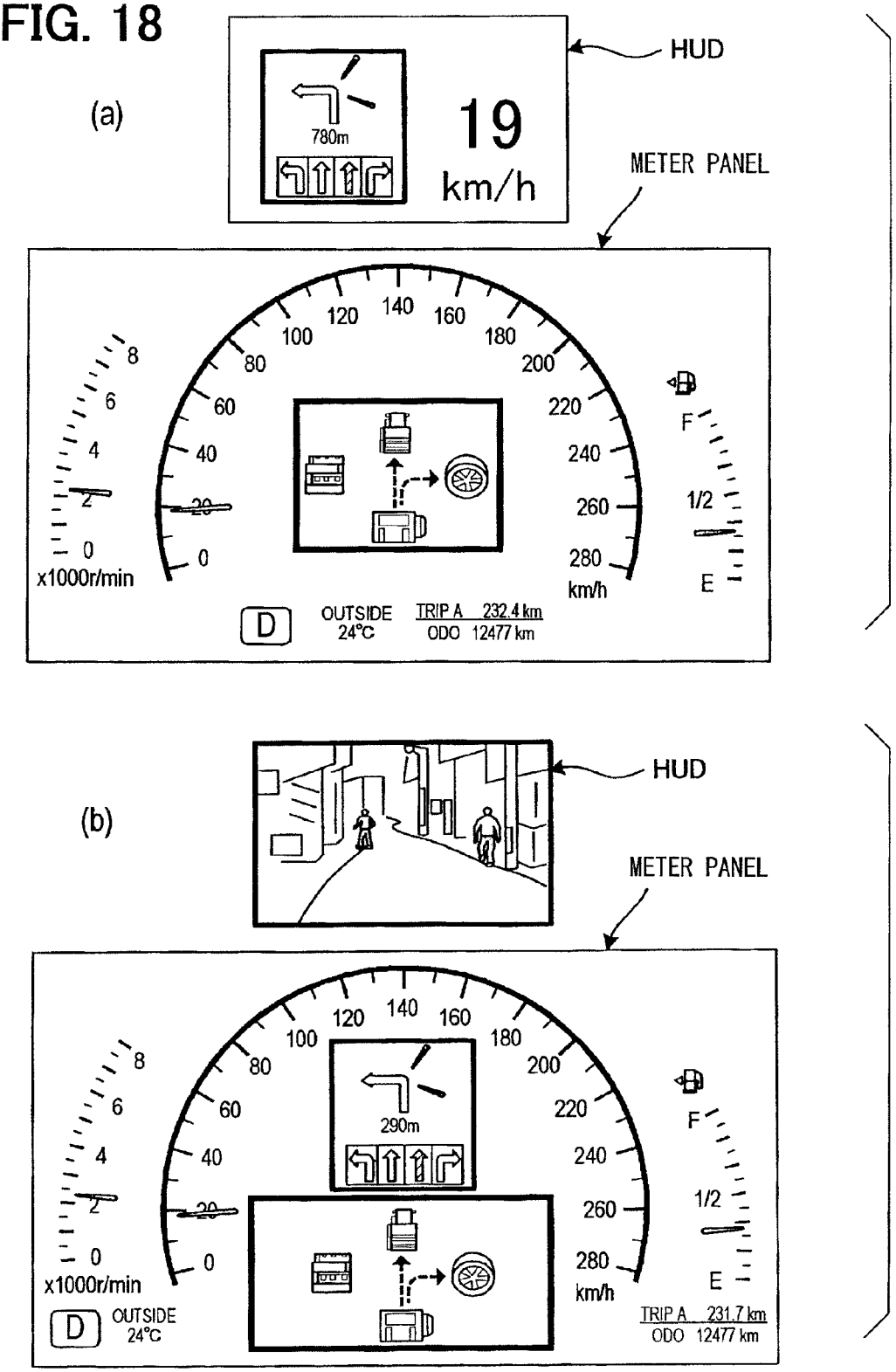
FIGS. 18($a$) and 18($b$) are explanatory diagrams illustrating screen transition in the meter panel and the head-up display.

In FIG. 18(a), the head-up display area displays the "lane/turn-by-turn" and "speed (HUD)." contents. The center area of the meter panel displays the "energy flow" content.

As illustrated in FIG. 19, the contents are prioritized as "night view," "lane/turn-by-turn," "speed (HUD)," and "energy flow" in descending order of information value. The "night view," "lane/turn-by-turn," and "speed (HUD)" contents have the information value greater than the area value of the head-up display area. These contents can be assigned to the head-up display area (circled in FIG. 19). The "energy flow" content has the information value lower than the area value of the head-up display area. The content cannot be assigned to the head-up display area (x'd in FIG. 19).

When there occurs a request to display "night view," the display control process sequentially generates a content list of contents in an order from a content having the great information value, so that the list of contents includes the active "night view" content (S110 in FIG. 4). Contents are assigned to the area in order from the beginning of the content list, that is, from a content having the great information value (S170).

As illustrated in FIG. 18(b), the "night view" content is preferentially assigned to the head-up display area. The "lane/turn-by-turn" and "energy flow" contents are then pushed out by the "night view" content and are assigned to the center area of the meter panel. The "speed (HUD)" content is hidden because it is displayed digitally and is used for the head-up display.

The following describes technical effects provided by the display control apparatus 1 according to the embodiment.

According to the embodiment, the display control apparatus 1 extracts contents whose attributes, namely, the display states, are "active." The display control apparatus 1 sorts the contents in descending order of information value to generate a content list (S110 in FIG. 4). The display control apparatus 1 assigns the contents to the areas according to the order of the content list (S170) to determine a content-area combination. That is, the display control apparatus 1 repeats the same process in the order of the content list to determine a content-area combination.

Each of contents is given a content parameter including at least one of a content evaluation value and a content size. The content evaluation value indicates priority of displaying the content. The content size indicates size of the display area. Each of areas is given an area parameter including at least one of an area evaluation value and an area size. The area evaluation value indicates priority of assigning the content. The area size indicates size of the display area. Based on the content parameter, the display control apparatus 1 determines an order to assign contents to areas. According to the order, the display control apparatus 1 determines whether there is an area capable of displaying a content based on the relation between the content parameter and area parameter. Based on the determination, the display control apparatus 1 sequentially determines content-area combinations.

As a result, the contents can be flexibly arranged by a relatively simple process.

According to the embodiment, the display control apparatus 1 compares the area value of an assignable area with the information value of a content. If the information value is greater than the area, value, the display control apparatus 1 assigns the content to the area (S170 in FIG. 4). Specifically, the content assignment control portion checks for availability of areas capable of displaying contents based on the relation between the content parameter and the area parameter. The content assignment control portion compares a content evaluation value contained in the content parameter with an area evaluation value contained in the area parameter. When the content evaluation value is larger than the area evaluation value, the content assignment control portion determines whether there is an available area capable of displaying the content. The embodiment associates the information value with a content and associates the area value with a area so that the content is assigned to an appropriate area. While the related art simply uses priorities, the embodiment assigns contents to areas based on a balance between the information value and the area value so that users can easily understand the displayed information.

If multiple assignable areas are available, the display control apparatus 1 assigns targeted contents to an area having the greatest area value (S170 in FIG. 4). This enables contents to be assigned to areas in descending order of area value, allowing users to easily understand the displayed information.

The embodiment sorts contents in descending order of information value to generate a content list (S110 in FIG. 4). Specifically, the content assignment control portion determines the order of contents assigned to the areas in descending order of content evaluation values contained in the content parameter. Because of this, since contents are assigned in descending order of information value to areas having great area value, the advantageous effect of assigning contents to appropriate areas.

The embodiment compares a content size with an area size and excludes an area whose area size is smaller than the content size of the content to be assigned (S150 in FIG. 4). Specifically, when the content assignment control portion determines whether there is an available area capable of displaying contents based on the relation between the content parameter and the area parameter, the content assignment control portion compares a content size contained in the content parameter with an area size contained in the area parameter. When the content size is smaller than the area size, the content assignment control portion determines that there is an available area capable of displaying the content. This eliminates the need to scroll or reduce contents for display and allows users to easily understand the displayed information.

According to the embodiment, the area management portion 12 maintains the hierarchical data structure of areas (see FIG. 3). When assigning contents, the area management portion 12 excludes an area located lower in hierarchy than the area assigned a content based on the hierarchical data structure (S140 in FIG. 4). This enables to easily understand the parental relation among areas and fast find assignable areas.

The embodiment changes content value and area value based on vehicle running situations (S100 in FIG. 4). Specifically, if the vehicle is running (YES at S101 in FIG. 5), the display control apparatus 1 changes the information value and the area value to those for the running state (S102 and S103). If the vehicle is stopped (NO at S101 in FIG. 5), the display control apparatus 1 changes the information value and the area value to those for the stop state (S104 and S105). Content evaluation values are changed according to vehicle situations. When a content evaluation value is changed, the content assignment control portion revises the order of assigning contents to the areas. When the order is further changed, the content assignment control portion determines whether there are available areas capable of displaying the contents based on the relation between the content parameters and the area parameters.

Based on the determination result, the content assignment control portion successively respecifies content-area combinations. This enables to assign contents to more appropriate areas.

The embodiment associates a content with "display state", which is the attribute of the content (see FIG. 2(a)). The embodiment displays (assigns) only a content whose display state is "active." This enables to easily manage whether to display contents.

According to the embodiment, the assignment management portion 13 previously manages the correspondence relation between a given content and an area corresponding to the content (see FIG. 2(b)). The content assignment gives preference to the correspondence relation. This enables to assign contents to more appropriate areas and ensure design possibilities. Intended contents can be assigned to areas intended by users.

The embodiment acquires various contents via the in-vehicle network (see FIG. 1). In this case, the content management portion 11 associates various contents with "information value," "content size," and "display state" to similarly manage the contents. This enables the same algorithm to assign contents to areas regardless of contents types.

Similarly, the embodiment associates "area value" and "area size" with areas of the A display apparatus 21 through the C display apparatus 23 to manage the areas. This enables the same algorithm to determine an area to which a content is to be assigned even if the display apparatuses 21 through 23 are different.

(Second Embodiment)

The above-mentioned embodiment determines a content-area combination based on whether the information value as content information is greater than the area value as area information. By contrast, the second embodiment calculates an evaluation value from content value included in content information and area value included in area information and determines a content-area combination based on the evaluation value.

The following describes only differences from the above-mentioned embodiment. The mutually corresponding parts in the following embodiment and the previous embodiment are designated by the same reference numerals and its detailed description is omitted for simplicity.

Figure 6:
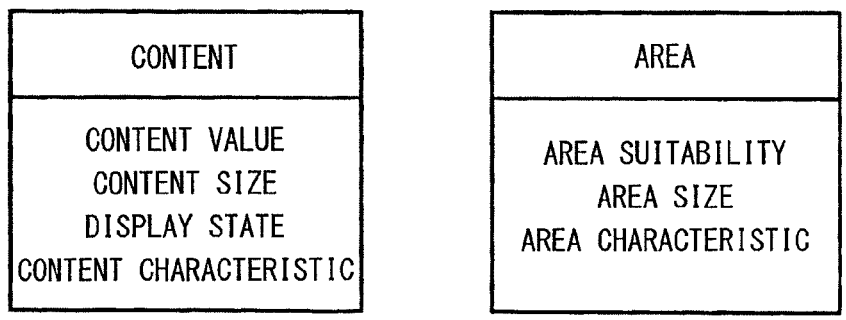
FIG. 6 is an explanatory diagram illustrating attributes associated with contents and areas according to a second embodiment.

According to the embodiment, the content management portion 11 manages contents associated with four attributes, "content value," "content size," "display state," and "content characteristic" as illustrated in FIG. 6.

The content value relates to each target viewer. According to the embodiment, target viewers include a driver, a front-seat passenger, and a rear-seat passenger. That is, the content value depends on target viewers.

For example, contents such as "vehicle speed" and "engine speed" are very significant for the driver. Therefore, each content has three types of value, content value (driver), content value (front-seat passenger), and content value (rear-seat passenger). The embodiment assumes that the content value is stored as a numeric value of "0" or larger. While the embodiment defines a driver, a front-seat passenger, and a rear-seat passenger as target viewers, rear-seat passengers may be further categorized into right and left ones. Only the driver may be defined as a target viewer to configure content value.

The content size concerns size of an area needed to display contents.

The content size is represented as the number of vertical and horizontal pixels, for example.

The display state provides information indicating whether the content is to be displayed or not. The display state is set to be "active" indicating that the content is to be displayed or "inactive" indicating that the content is not to be displayed.

A content characteristic indicates a characteristic that the user requires to have in order to utilize the content. The embodiment links each content with three content characteristics of a visual line characteristic, an expressiveness characteristic, and an operation characteristic.

The visual line characteristic is used as a criterion to determine whether to assign a content to a display area that enables the driver need not to move his or her visual line or that enables the driver to easily view the content. The visual line characteristic is represented as one of five grades "1" through "5." As the characteristic value increases, the corresponding content more strictly disallows the visual line movement. A content not allowing the visual line movement is for example a content that requires frequent confirmation during vehicle running and that is "vehicle speed". The visual line characteristic is a characteristic directed to drivers.

The expressiveness characteristic is used as a criterion to determine whether a display area requires expressiveness (e.g., resolution or color). The expressiveness characteristic is represented as one of five grades "1" through "5." As the value increases, the corresponding content requires more expressiveness. A content that requires expressiveness is for example a content that has a large amount of information and that is "map" for navigation.

The operation characteristic is used as a criterion to determine whether the content requires operations. The operation characteristic is represented as one of five grades "1" through "5." As the value increases, the corresponding content requires more operations. A content that requires operations is a content that necessitates operation to select a musical tune for replay and that is "audio control panel" for navigation.

The embodiment classifies the characteristics into five grades "1" through "5" but is not limited thereto. The characteristics may be classified into at least two or more grades.

The area management portion 12 according to the embodiment includes a storage device (storage portion) that stores three attributes (parameters) of "area suitability," "area size," and "area characteristic," linked with each area as illustrated in FIG. 6.

The area suitability is used as a criterion to indicate viewability for each target viewer. As described above, target viewers include a driver, a front-seat passenger, and a rear-seat passenger. The area suitability depends on target viewers. For example, areas in a meter panel increase the area suitability for the driver. Areas in a liquid crystal display apparatus to display maps for navigation increase the area suitability for the driver and the front-seat passenger. Each area contains three suitabilities of area suitability (driver), area suitability (front-seat passenger), and area suitability (rear-seat passenger). The embodiment represents the area suitability as one of ten grades "1" through "10" but is not limited thereto.

The area size concerns size of an area. Similarly to the content size, the area size is represented as the number of vertical and horizontal pixels, for example.

The area characteristic corresponds to the content characteristic. The embodiment links each area with three characteristics of the visual line characteristic, the expressiveness characteristic, and the operation characteristic.

The visual line characteristic uses one of five grades "1" through "5" to indicate whether the target viewer needs to move his or her visual line. As the value increases, the corresponding area requires less visual line movement. An area that requires no visual line movement is, for example, a head-up display area. The visual line characteristic applies to drivers.

The expressiveness characteristic uses one of five grades "1" through "5" to indicate whether an area requires expressiveness (e.g., resolution or color). As the value increases, the corresponding area requires more expressiveness. An area that requires more expressiveness is for example an area in the liquid crystal display apparatus to display maps for navigation.

The operation characteristic uses one of five grades "1" through "5" to indicate whether an area enables operations. As the value increases, the corresponding area enables more complicate operations. An area that enables complicate operations is for example an area in the liquid crystal display apparatus integrated with a touch panel.

The embodiment classifies the area characteristics into five grades "1" through "5" but is not limited thereto. The area characteristics may be classified into at least two or more grades.

Similarly to the above-mentioned embodiment, the area management portion 12 manages areas for the A display apparatus 21 through the C display apparatus 23 according to a hierarchical data structure (see FIG. 3).

The assignment management portion 13 also stores a suitability table to calculate suitabilities based on the content characteristic and the area characteristic, indispensable exclusion constraint expressions to be described later, and assignment information about assignment of specific contents to specific areas.

The suitability table includes a visual line suitability table (see FIG. 7(*a*)), an expressiveness suitability table (see FIG. 7(*b*)), and an operation suitability table (see FIG. 7(*c*)). The visual line suitability table is used to calculate visual line suitabilities based on visual line characteristics of contents and areas. The expressiveness suitability table is used to calculate expressiveness suitabilities based on expressiveness characteristics of contents and areas. The operation suitability table is used to calculate operation suitabilities based on operation characteristics of contents and areas.

The suitability table uses one of ten grades "1" through "10" to represent the suitability. A larger value indicates greater suitability. Similarly to the area suitability, the suitability table is not limited to ten grades for representation.

The suitability tables are used to calculate suitabilities corresponding to characteristics from the content characteristics contained in contents and the area characteristics contained in areas. For example, "map" for navigation using a large amount of information is available as a content requiring the expressiveness and is therefore given expressiveness characteristic "5." An area in the liquid crystal display apparatus requires great expressiveness and is therefore given expressiveness characteristic "5." In this case, the example of FIG. 7(*b*) calculates the expressiveness suitability as maximum value "10." This signifies that a combination of content "map" and an area in the liquid crystal display apparatus requires the maximum expressiveness suitability.

The specification limit is exceeded if a content of expressiveness characteristic "1" to indicate a small amount of information and no need for the expressiveness is assigned to an area of expressiveness characteristic "5" to indicate the great expressiveness, for example. The bottom left part of each suitability table indicates combinations that exceed the specification limit. In this case, the suitability is set to be smaller than the maximum value in consideration of assignment of other contents even if the suitability is sufficient.

A indispensable exclusion constraint expression is predetermined to assign the necessary content to a proper area or prevent duplicate contents from being redundantly displayed in multiple areas.

The embodiment defines indispensable exclusion constraint expressions using five operators δ, |, ˆ, /, and +. FIG. 8(*a*) lists meanings of the operators. For example, suppose X and Y are active contents.

Then, X&Y signifies that both X and Y are displayed.

X|Y signifies that at least one of X and Y is displayed.

XˆY signifies that X or Y is displayed.

X/Y signifies that X or Y is displayed or neither X nor Y is displayed.

X+Y signifies that both X and Y are displayed or neither X nor Y is displayed. Using operator ! that signifies negation, X/Y equals !(X&Y) and X+Y equals !(XˆY). According to the embodiment, the display control process to be described later uses the operators. The display control process avoid using operator ! to signify negation for simplicity of processes.

The assignment information about assignment of a specific content to a specific area indicates correspondence relation between a predetermined area and a predetermined content. While the embodiment dynamically assigns contents to areas, some contents are statically assigned by reference to the correspondence relation.

According to the embodiment, the content assignment control portion 14 evaluates and stores content-area combinations based on the information stored in the content management portion 11, the area management portion 12, and the assignment management portion 13. The display layout control portion 15 displays contents based on content-area combinations stored by the content assignment control portion 14.

Figure 9:
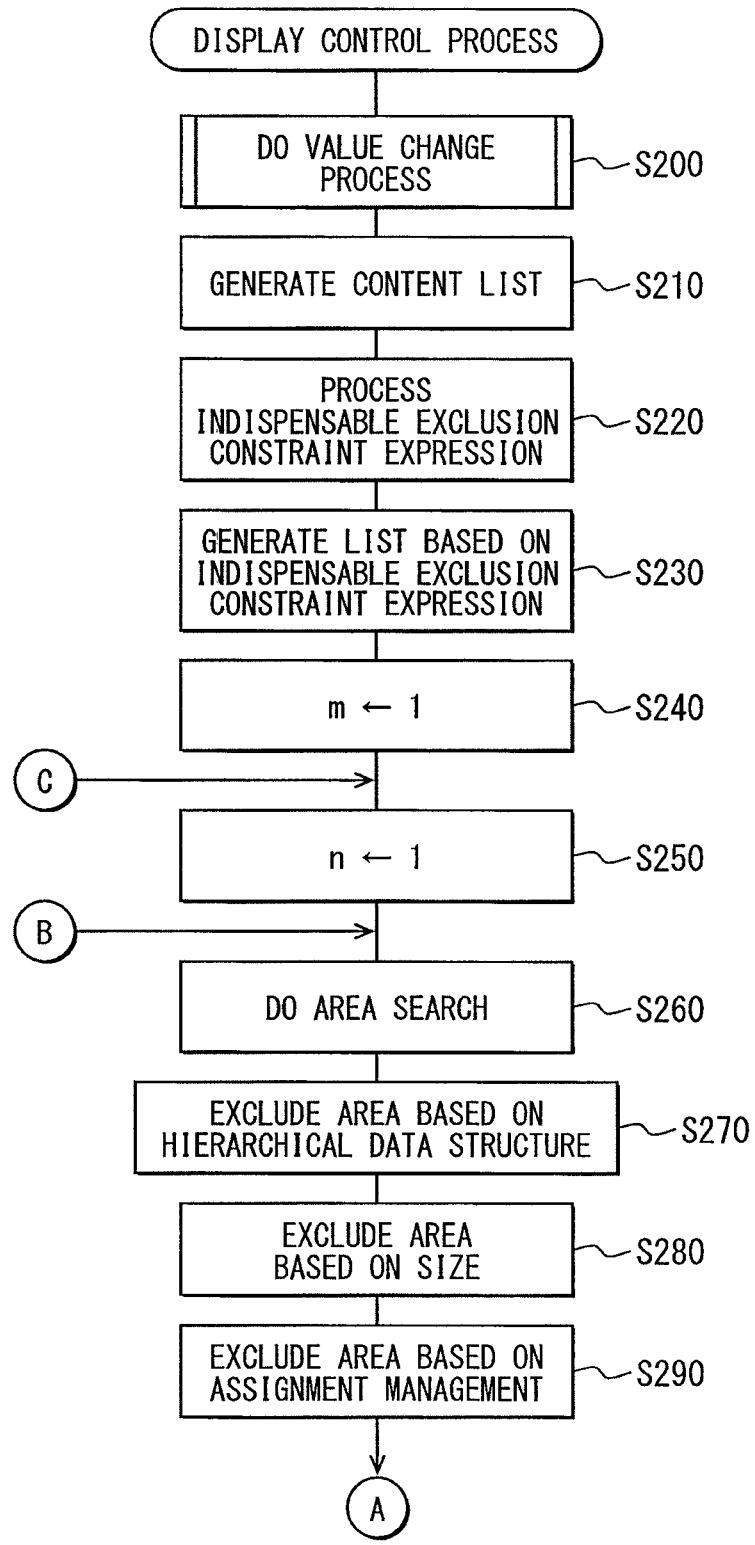
FIG. 9 is a flowchart illustrating the first half of a display control process according to a second embodiment.
Figure 10:
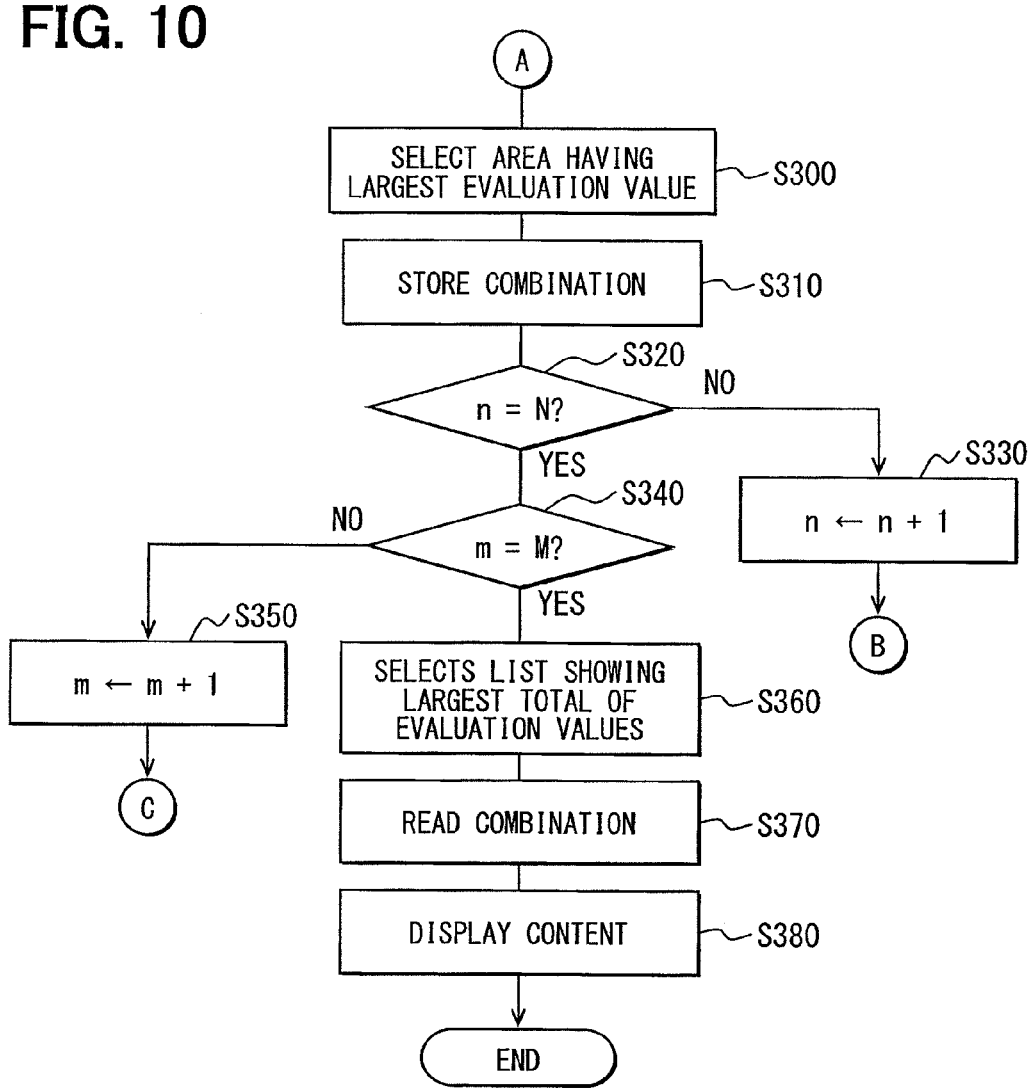
FIG. 10 is a flowchart illustrating the second half of the display control process according to the second embodiment.

The display control process is described below. FIG. 9 is a flowchart illustrating the first half of the display control process. FIG. 10 is a flowchart illustrating the second half of the display control process. In the description below, the content value and the area value are generically termed "value" and the content size and the area size are generically termed "size" as needed.

The value change process is performed at S200. This process changes the content value of a content and the area suitability of an area based on a vehicle situation (in the embodiment, a running situation indicating whether the vehicle is running or stopped). This process corresponds to that at S100 in FIG. 4 of the above-mentioned embodiment.

At S110, the display control process generates a content list. The process extracts a content having, the display state "active" as its attribute and sorts the contents in descending order of the content value. For example, suppose that contents X, Y, Z, and W are available, the content value is prioritized as X, Y, Z, and W in descending order, and the "active" contents are X, Z, and W. Then, the content list "X→Z→W" is generated. This example assumes that as many as N contents are sorted.

At S220, the display control process processes an indispensable exclusion constraint expression. If an attempt is made to apply the indispensable exclusion constraint expression to contents in the content list, the indispensable exclusion constraint expression may contain a content whose display state is "inactive". For this reason, the embodiment previously performs a process of read an indispensable exclusion constraint expression containing "inactive" contents and changing the indispensable exclusion constraint expression into an equivalent and simpler indispensable exclusion constraint expression. If the indispensable exclusion constraint expression contains a content not to be displayed, the display control process rewrites the indispensable exclusion constraint expression into a constraint expression for contents to be displayed. This enables to prepare indispensable exclusion constraint expressions regardless of whether the content is "active" or "inactive."

Specifically, the display control process generates a syntax tree from indispensable exclusion constraint expressions as illustrated in FIG. 8(*b*). FIG. 8(*b*) shows indispensable exclusion constraint expression "(X&Y)ˆZ" as a syntax tree. Suppose that contents X and Z are "active" and content Y is "inactive." In this case, the display control process removes content Y and its prior operator "&" from the syntax tree (see symbol J). FIG. 8(*c*) illustrates the resulting syntax tree corresponding to indispensable exclusion constraint expression "XˆZ." In this way, the technique of removing an "inactive" content and its prior operator is applied to a case where prior operators are &, |, and ˆ.

FIG. 8(*d*) illustrates the use of operator "/." The display control process removes "inactive" content Y and its prior operator "/" (see symbol. L) and also removes content X posterior to the removed operator "/" (see symbol K). The same applies to operator "+."

An unexpected result may occur if an operator indicative of negation is used to process indispensable exclusion constraint expressions. For this reason, the embodiment does not use an operator indicative of negation.

At S230, the display control process generates a content list based on the indispensable exclusion constraint expression. For example, suppose that indispensable exclusion constraint expression "X^Z" is used as illustrated in FIG. 8(c) and content list "X→Z→W" is generated at S110. Then, the display control process generates two new content lists "X→W" and "Z→W." The lists begin with X and Z because one of X and Z must be displayed. The list begins with a content related to the indispensable exclusion constraint expression. The display control process then sorts the order relation among contents based on content value. For example, the display control process sorts contents based on content value for the driver. Likewise, the display control process may sort contents based on content value for the front-seat passenger or the rear-seat passenger. In the following, it is assumed that as many as M lists are newly generated.

At S240, the display control process initializes variable m indicating lists to "1." The display control process is performed on the first list, the second list, the third list, and so on each time variable m is incremented.

At S250, the display control process initializes variable n indicating contents to "1." The display control process is performed on the first content in the mth list, the second content in the mth list, the third content in the mth list, and so on each time variable n is incremented.

At S260, the display control process searches for areas. This display control process searches for all area to which no contents are assigned.

At S270, the display control process excludes an area based on the hierarchical data structure. When a content is assigned to an area located higher than a certain area in the hierarchical data structure, the display control process excludes the certain area even if the certain area is assigned no content.

At S280, the display control process excludes an area based on the content size and the area size. The display control process excludes an area whose area size is smaller than the content size of a content to be assigned.

At S290, the display control process excludes an area based on assignment management. Specifically, the display control process excludes an area outside the content-area correspondence relation based on the assignment information stored in the assignment management portion 13.

At S300 in FIG. 10, the display control process calculates evaluation values and selects an area having the largest evaluation value. This process uses a predetermined calculation expression to calculate evaluation values and selects an area having the largest evaluation value.

Specifically, the embodiment calculates an evaluation value using a target viewer evaluation value and a characteristic evaluation value.

The target viewer evaluation value includes a driver evaluation value (DE), a front-seat passenger evaluation value (AE), and a rear-seat passenger evaluation value (RE). The characteristic evaluation value includes a driver characteristic evaluation value (DCE), a front-seat passenger characteristic evaluation value (ACE), and a rear-seat passenger characteristic evaluation value (RCE). To simplify expressions, the driver is expressed as "D," the front-seat passenger as "A," and the rear-seat passenger as "R." The embodiment defines the evaluation values as follows.

$DE = K[D] \times \text{content value } [D] \times \text{area suitability } [D]$ $AE = K[A] \times \text{content value } [A] \times \text{area suitability } [A]$ $RE = K[R] \times \text{content value } [R] \times \text{area suitability } [R]$ $DCE = (K1 \times \text{visual line suitability} + K2 \times \text{expressiveness suitability} + K3 \times \text{operation suitability}) \div (K1 + K2 + K3)$ $ACE = (K4 \times \text{expressiveness suitability} + K5 \times \text{operation suitability}) \div (K4 + K5)$ $RCE = (K6 \times \text{expressiveness suitability} + K7 \times \text{operation suitability}) \div (K6 + K7)$ In these expressions, K[D], K[A], and K[R] denote the presence of a driver, a front-seat passenger, and a rear-seat passenger, respectively, and are set to "1" when they are aboard or to "0" otherwise. K1 through K7 denote weighting coefficients.

The visual line suitability is characteristic of only the driver and is not used for calculating ACE and RCE.

The evaluation value is expressed as follows.

Evaluation value = $DE \times DCE + AE \times ACE + RE \times RCE$

At S310, the display control process stores a content-area combination that causes the largest evaluation value at S300.

At S320, the display control process determines whether variable n equals content count N. This process determines whether all contents contained in the mth list are processed. If the determination results in n=N (YES at S320), the display control process proceeds to S340. If the determination results in n≠N (NO at S320), an unprocessed content remains.

The display control process increments variable n at 5330 and repeats from S260 in FIG. 9.

At S340, the display control process determines whether variable m equals list count M. This process determines whether all lists are processed. If the determination results in m=M (YES at S340), the display control process proceeds to S360. If the determination results in m≠M (NO at S340), an unprocessed list remains. The display control process increments variable m at S350 and repeats from S250 in FIG. 9.

At S360, the display control process selects a list showing the largest total of evaluation values based on the total of evaluation values in each list.

At S370, the display control process reads content-area combinations in the list selected at S360. This process reads combinations stored at S310.

At S380, the display control process displays a content. This process displays the content in the assigned area.

The value change process at S200 in FIG. 9 is similar to that in the above-mentioned embodiment. However, the second embodiment changes the content value and the area suitability based on vehicle situations.

The following describes the above-mentioned display control process using more specific examples.

As illustrated in FIG. 20(a), the "vehicle speed" content and the "map" content for navigation are assumed to be active. The "vehicle speed" content digitally displays the vehicle speed. The "map" content displays maps for navigation.

Areas to be displayed include those in the "meter panel" and in the "liquid crystal display apparatus" centered in the vehicle.

As described above, the content value includes the content value [driver], the content value [front-seat passenger], and the content value [rear-seat passenger]. These types of value are represented as C[D], C[A], and C[R], respectively. The content characteristic includes the visual line characteristic, the expressiveness characteristic, and the operation characteristic. These characteristics are represented as EC, RC, and OC, respectively.

Specifically, the "vehicle speed" content is configured as C[D]=50, C[A]=10, C[R]=10, EC=5, RC=3, and OC=2.

The "map" content is configured as C[D]=40, C[A]=40, C[R]=30, EC=4, RC=4, and OC=4.

Similarly, the area suitability includes the area suitability [driver], the area suitability [front-seat passenger], and the area suitability [rear-seat passenger]. These suitabilities are represented as A[D], A[A], and A[R], respectively. The area characteristic includes the visual line characteristic, the expressiveness characteristic, and the operation characteristic. These characteristics are represented as EA, RA, and OA, respectively.

Specifically, the "meter panel" area is configured as A[D]=10, A[A]=2, A[R]=2, EA=4, RA=3, and OA=3.

The "liquid crystal display apparatus" area is configured as A[D]=7, A[A]=10, A[R]=5, EA=3, RA=4, and OA=5.

The display control process generates a content list (S210 in FIG. 9). To do this, the display control process sorts active contents by the content value [driver]. The display control process may sort active contents by the content value [front-seat passenger] or the content value [rear-seat passenger]. The display control process then processes an indispensable exclusion constraint expression (S220) and generates a list based on the indispensable exclusion constraint expression (S230). The generated list contains contents in the order of "vehicle speed"→"map." The display control process selects an area corresponding to the largest evaluation value for "vehicle speed" in the order of the list (S300 in FIG. 10).

The display control process calculates evaluation values of the combination of "vehicle speed" and "meter panel" and evaluation values of the combination of "vehicle speed" and "liquid crystal display apparatus." The driver, the front-seat passenger, and, the rear-seat passenger are assumed to be present. This signifies K[D]=K[A]=K[R]=1.

(1) Evaluation values of the combination of "vehicle speed" and "meter panel"

$$DE=K[D] \times C[D] \times A[D]=1 \times 50 \times 10=500$$

$$AE=K[A] \times C[A] \times A[A]=1 \times 10 \times 2=20$$

$$RE=K[R] \times C[R] \times A[R]=1 \times 10 \times 2=20$$

Because of EC=5 and EA=4, visual line suitability is "8" from FIG. 7(a). Because of RC=3 and RA=3, expressiveness suitability is "10" from FIG. 7(b). Because of OC=2 and OA=3, operation suitability is "9" from FIG. 7(c).

When weighting coefficients K1 through K7 are each assumed to be "1."

$$DCE=(8+10+9)/3=9$$

$$ACE=(10+9)/2=9.5$$

$$RCE=(10+9)/2=9.5$$

Thus, evaluation value=DE×DCE+AE×ACE+RE×RCE=4500+190+190=4880

(2) Evaluation values for the combination of "vehicle speed" and "liquid crystal display apparatus"

$$DE=K[D] \times C[D] \times A[D]=1 \times 50 \times 7=350$$

$$AE=K[A] \times C[A] \times A[A]=1 \times 10 \times 10=100$$

$$RE=K[R] \times C[R] \times A[R]=1 \times 10 \times 5=50$$

Because of EC=5 and EA=3, visual line suitability is "6" from FIG. 7(a). Because of RC=3 and RA=4, expressiveness suitability is "9" from FIG. 7(b). Because of OC=2 and OA=5, operation suitability is "7" from FIG. 7(c).

When weighting coefficients K1 through K7 are each assumed to be $$DCE=(6+9+7)/3=7.333\ldots$$

$$ACE=(9+7)/2=8$$

$$RCE=(9+7)/2=8$$

Thus, evaluation value=DE×DCE+AE×ACE+RE×RCE=2566+800+400=3766

A combination of "vehicle speed" and "meter panel" results from the above-mentioned evaluation values (1) and (2).

In this case, the "map" content is assigned to the "liquid crystal display apparatus" area as illustrated in FIG. 20(a).

It is assumed that because of changing the shift pattern to R, the "back monitor" content is placed in "active state".

Specifically, it is assumed that the "back monitor" content is configured as C[D]=45, C[A]=40, C[R]=30, EC=4, RC=4, and OC=3.

In this case, the list containing contents in the order of "vehicle speed," "back monitor," and "map." is generated. In accordance with the order, the display control process selects an area corresponding to the largest evaluation value for "vehicle speed" (S300 in FIG. 10).

As described above, the combination of "vehicle speed" and "meter panel" is used for the "vehicle speed" content. Thus, in this case, the "back monitor" content is given the next highest priority and is therefore assigned to the area of "liquid crystal display apparatus" as illustrated in FIG. 20(b).

The following describes technical effects provided by the display control apparatus 1 according to the embodiment.

The embodiment also determines a content-area combination in the order of the content list. That is, the display control apparatus 1 repeats the same process in the order of the content list to determine a content-area combination (see FIGS. 9 and 10). Based on the content parameter, the display control apparatus 1 determines an order to assign contents to areas.

According to the order, the display control apparatus 1 determines whether there is an area capable of displaying a content based on the relation between the content parameter and area parameter. Based on the determination, the display control apparatus 1 sequentially determines content-area combinations.

As a result, the relatively simple process can flexibly arrange contents.

According to the embodiment, the content management portion 11 manages contents associated with content value indicating information value for each of target viewers. The area management portion 12 manages areas associated with area suitabilities indicating locational suitabilities of areas. The content assignment control portion 14 determines a content-area combination using target viewer evaluation values based on content value and area suitabilities (S300 in FIG. 10). The content value and the area suitability are provided for each target viewer. That is, the content parameter contains a content evaluation value. The area parameter contains an area evaluation value. The content evaluation value and the area evaluation value are provided for each target viewer to whom display is targeted in a vehicle compartment. The content assignment control portion calculates an evaluation value containing the target viewer evaluation value for each target viewer based on the content evaluation value and the area evaluation value and determines a content-area combination based on the evaluation value. This enables to display information so that users can easily understand the displayed information unlike the mere use of priorities according to the related art.

According to the embodiment, the content management portion 11 sorts contents in descending order of content value to generate a content list (S210 in FIG. 9). That is, the content control portion determines the order of assigning contents to an area in descending order of content evaluation values contained in the content parameter. This determines content-area combinations in descending order of content value. Therefore, the contents can be assigned to proper areas.

In addition, according to the embodiment, the content management portion 11 manages contents associated with content characteristics indicating characteristics of contents. The area management portion 12 manages areas associated with area characteristics indicating characteristics of areas. The content assignment control portion 14 determines a content-area combination based on the target viewer evaluation value and the characteristic evaluation value that is calculated based on the content characteristic and the area characteristic (S300 in FIG. 10). This determines a content-area combination in consideration of content and area characteristics. This enables to display information so that users can more easily understand the displayed information.

Specifically, the display control apparatus 1 obtains a visual line suitability based on visual line characteristics of a content and an area to calculate a characteristic evaluation value. The display control apparatus 1 obtains an expressiveness suitability based on expressiveness characteristics of a content and an area to calculate a characteristic evaluation value. The display control apparatus 1 finds an operation suitability based on operation characteristics of a content and an area and calculates a characteristic evaluation value. The content parameter contains a content characteristic including at least one of a visual line characteristic, an expressiveness characteristic, and an operation characteristic. The area parameter contains an area characteristic corresponding to the content characteristic. The content assignment control portion calculates an evaluation value containing the characteristic evaluation value based on the content characteristic and the area characteristic and determines a content-area combination based on the evaluation value. This enables to determine a content-area combination based on characteristic evaluation values concerning the visual line, the expressiveness, and the operability. Information can be displayed so that users can easily understand the displayed information.

The embodiment stores the suitability table (see FIG. 7) for finding suitabilities to calculate a characteristic evaluation value from the content characteristic and the area characteristic. This enables to relatively easily derive characteristic evaluation values from the content characteristic and the area characteristic.

According to the embodiment, the assignment management portion 13 stores indispensable exclusion constraint expressions as display information to define the indispensable exclusive relation between contents. The content assignment control portion 14 processes indispensable exclusion constraint expressions (S220 in FIG. 9) to generate a content list based on the indispensable exclusion constraint expressions (S230). The content list stores indispensable exclusion constraint expressions that define the rules of displaying contents. The content assignment control portion determines an order of assigning contents to an area based on the indispensable exclusion constraint expressions. This enables to determine a content-area combination including the indispensable exclusive relation among contents. The information can be displayed more appropriately.

The content assignment control portion 14 sorts contents based on the indispensable exclusion constraint expressions so that the content to be displayed necessarily is positioned at the beginning of the content list (S230 in FIG. 9). The content assignment control portion determines the order of assigning contents to an area so that the content associated with the indispensable exclusion constraint expressions is assigned first. Content-area combinations are determined sequentially from the content to be displayed necessarily. The content to be displayed necessarily is reliably assigned to an area.

If multiple content lists are available, the content assignment control portion 14 performs the process on each list (S240 in FIG. 9 and S340 and S350 in FIG. 10). The content assignment control portion 14 selects the list corresponding to the largest total of evaluation values (S360) and determines a content-area combination (S370). This enables to easily determine a content-area combination including the indispensable exclusive relation among contents.

The embodiment compares the content size with the area size and excludes an area whose area size is smaller than the content size (S280 in FIG. 9). Specifically, the content assignment control portion checks for availability of an area capable of displaying contents based on the relation between the content parameter and the area parameter. To do this, the content assignment control portion compares the content size contained in the content parameter with the area size contained in the are parameter. If the content size is smaller than the area size, the content assignment control portion determines that a displayable area is available. This eliminates the need to scroll or reduce contents for display and allows users to easily understand the displayed information.

According to the embodiment, the area management portion 12 maintains the hierarchical data structure of areas (see FIG. 3). When assigning contents, the area management portion 12 excludes an area located lower in hierarchy than the area assigned a content based on the hierarchical data structure (S270 in FIG. 9). This enables to easily understand the parental relation among areas and fast find assignable areas.

The embodiment changes content value and area value based on vehicle running situations (S200 in FIG. 9). Content evaluation values are changed according to vehicle situations. When a content evaluation value is changed, the content assignment control portion revises the order of assigning contents to the area. When the order is further changed, the content assignment control portion checks for availability of areas capable of displaying contents based on the relation between the content parameters and the area parameters. Based on the determination, the content assignment control portion successively respecifies content-area combinations. This enables to assign contents to more appropriate areas.

The embodiment associates a content with "display state" as a content attribute (see FIG. 6). The embodiment displays only a content whose display state is "active." This enables to easily manage whether to display contents.

According to the embodiment, the assignment management portion 13 previously manages the correspondence relation between a given content and an area and excludes an area that does not belong to the content-area correspondence relation (S290 in FIG. 9). This enables to assign contents to more appropriate areas and ensure design possibilities. Intended contents can be assigned to areas intended by users.

(Third Embodiment)

The first embodiment assigns a content to an area having the greatest area value out of areas whose area value are less than the information value of the content. The second embodiment determines a content-area combination based on a target viewer evaluation value calculated from the content value and the area suitability and based on a characteristic evaluation value calculated from the content characteristic and the area characteristic.

The third embodiment determines a content-area combination based on the content size and the area size. The following mainly describes differences from the above-mentioned embodiments. The mutually corresponding parts in the following embodiment and the previous embodiments are designated by the same reference numerals and a detailed description is omitted for simplicity.

Figure 11:
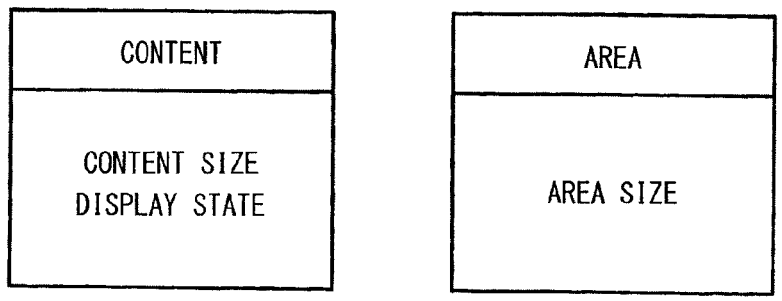
FIG. 11 is an explanatory diagram illustrating attributes associated with a content and an area according to a third embodiment.

Also in this embodiment, the content management portion 11 manages various contents including those belonging to different categories. The content management portion 11 manages contents associated with two attributes of "content size" and "display state" as illustrated in FIG. 11.

The content size concerns an area needed to display contents. The content size is represented as the number of vertical and horizontal pixels, for example. The display state provides information indicating whether the content is to be displayed or not. The display state is set to be "active" indicating that the content is to be displayed or "inactive" indicating that the content is not to be displayed.

The area management portion 12 manages multiple areas to be displayed. The areas are provided for screens of the three display apparatuses, that is, the A display apparatus 21 through the C display apparatus 23. The area management portion 12 similarly manages the areas for the three display apparatuses, that is, the A display apparatus 21 through the C display apparatus 23. The area management portion 12 equally manages areas for the A display apparatus 21 and those for the B display apparatus 22. The area management portion 12 manages areas associated with the "area size" attribute as illustrated in FIG. 11.

Similarly to the content size, the area size concerns an area and is represented by the number of vertical and horizontal pixels, for example.

Similarly to the above-mentioned embodiments, the area management portion 12 manages areas for the A display apparatus 21 through the C display apparatus 23 according to a hierarchical data structure (see FIG. 3).

Also similarly to the above-mentioned embodiments, the assignment management portion 13 stores the information about assignment of a given content to a given area.

The embodiment provides the content management portion 11 and the area management portion 12 as described above. Therefore, the content assignment control portion 14 compares the content size with the area size and assigns the contents to an area whose area size is the most approximate to the compared area size.

The process for display control is similar to the first embodiment. The following describes the display control process with reference to FIG. 4. However, the value change process at S100 is not performed. This is because the third embodiment does not use the information value or the area value used for the above-mentioned embodiments.

At S110, the display control process first generates a content list. The process extracts a content having its attribute, that is, the display state, set to be "active" and sorts the contents in descending order of the content sizes. This example assumes that as many as N contents are sorted.

At S120, the display control process initializes variable n indicating contents to "1." The display control process processes the first content, the second content, the third content, and so on each time variable n is incremented.

At S130, the display control process searches for areas. The display control process searches for all areas to which no contents are assigned.

At S140, the display control process excludes an area based on the hierarchical data structure. Even if an area is assigned no content, the display control process excludes the area when a content is assigned to an area located higher than the area in the hierarchical data structure.

At S150, the display control process excludes an area based on the content size and the area size. The display control process excludes an area whose area size is smaller than the content size of a content to be assigned.

At S160, the display control process excludes an area based on assignment management. Specifically, the display control process excludes an area outside the content-area correspondence relation based on the correspondence relation stored in the assignment management portion 13.

At S170, the display control process assigns a content to an area.

This process assigns the content to an area that belongs to areas targeted up to S160 and has the area size the most approximate to the content size of the content.

At S180, the display control process determines whether variable n equals content count N. The display control process determines whether all contents have been processed. If the result is n=N (YES at S180), the display control process proceeds to S190. If the result is n≠N (NO at S180), an unprocessed content remains. At S200, the display control process increments variable n and repeats the process from S130.

At S190, the display control process displays the content. The display control process displays the content in the assigned area.

The following describes effects provided by the display control apparatus 1 according to the embodiment.

Also in this embodiment, the display control apparatus 1 assigns the contents to the areas according to the order of the content list (S170 in FIG. 4) to determine a content-area combination. Based on the content parameter, the display control apparatus 1 determines an order to assign contents to areas.

According to the order, the display control apparatus 1 determines whether there is an area capable of displaying a content based on the relation between the content parameter and area parameter. Based on the determination, the display control apparatus 1 sequentially determines content-area combinations.

That is, the display control apparatus 1 repeats the same process in the order of the content list to determine a content-area combination. As a result, the relatively simple process can flexibly arrange contents.

According to the embodiment, the display control apparatus 1 compares the content size with the area size. The display control apparatus 1 excludes an area whose area size is smaller than the content size (S150 in FIG. 4). On that condition, the display control apparatus 1 assigns the content to an area that is the most approximate to the content size (S170). The content assignment control portion checks for the availability of an area capable of displaying contents based on the relation between the content parameter and the area parameter. To do this, the content assignment control portion compares the content size contained in the content parameter with the area size contained in the area parameter. If the content size is smaller than the area size, the content assignment control portion determines that a displayable area is available. The content assignment control portion assigns the content to an area whose size is smallest. This enables to assign contents to areas according to a balance between the content size and the area size so that users can easily understand the displayed information unlike the mere use of priorities according to the related art.

The embodiment also associates a content with "display state" as a content attribute (see FIG. 11). The embodiment displays only a content whose display state is "active." This enables to easily manage whether to display contents.

According to the embodiment, the area management portion 12 maintains the hierarchical data structure of areas (see FIG. 3). When assigning contents, the area management portion 12 excludes an area located lower in hierarchy than the area assigned a content based on the hierarchical data structure (S140 in FIG. 4). This enables to easily understand the parental relation among areas and fast find assignable areas.

According to the embodiment, the assignment management portion 13 previously manages the correspondence relation between a given content and an area corresponding to the content (see FIG. 2(b)). The content assignment gives preference to the correspondence relation. This enables to assign contents to more appropriate areas and ensure design possibilities. Intended contents can be assigned to areas intended by users.

The embodiment acquires various contents via the in-vehicle network (see FIG. 1). In this case, the content management portion 11 associates various contents with "content size" and "display state" to similarly manage the contents. This enables the same algorithm to assign contents to areas regardless of contents types.

Similarly, the embodiment associates "area size" with areas for the A display apparatus 21 through the C display apparatus 23 to manage the areas.

This enables the same algorithm to determine an area to which a content is to be assigned even if the display apparatuses 21 through 23 are different.

(Other Embodiments)

The first embodiment assigns contents to areas in the order of the content list under the condition that the information value of contents is greater than the area value of areas. The first embodiment can also use indispensable exclusion constraint expressions as described in the second embodiment and allow the display control to reflect the indispensable exclusive relation among contents.

For example, suppose that indispensable exclusion constraint expression "large mail^small mail" between two contents "large mail" and "small mail." The display control process generates a list containing the "large mail" content and a list containing the "small mail" content. A content matching the indispensable exclusion constraint expression is placed at the beginning of the list. The expression signifies displaying one of "large mail" and "small mail." The "large mail" and "small mail" contents signify mail reception. The "large mail" content is large-sized and displays part of the mail body. The "small mail" content is small-sized and merely indicates the mail reception.

As illustrated in FIG. 21(a), the center area of the meter panel displays the "large mail" content. For example, suppose that three contents "lane/turn-by-turn," "ACC," and "energy flow" expel the "large mail" content from the center area of the meter panel. In this case, as illustrated in FIG. 21(b), the upper right area of the meter panel displays the "small mail" content according to indispensable exclusion constraint expression "large mail^small mail."

Contents can be dynamically assigned to proper areas in descending order of information value for the contents under the condition that the information value of contents is greater than the area value of areas.

However, various relations are available among contents. There may be requests that discord with the assignment based on the information value and the area value. As an example, there may be a request to assign necessary contents to a given area. As another example, there may be a request to avoid redundantly displaying duplicate contents in multiple areas. To solve these problems, the above-mentioned indispensable exclusion constraint expressions are used. The following describes examples of the indispensable exclusion constraint expressions.

In FIGS. 22(a) and 22(b), contents "large gadget," "notification," and "small gadget" are assumed to be active. Contents "large gadget" and "small gadget" notify the call termination. The same applies to the following description. As illustrated in FIG. 15, content "large gadget" has the information value set to "120." Content "notification" has the information value set to "53." Content "small gadget" has the information value set to "50."

As illustrated in FIG. 22(a), the center area of the meter panel displays "large gadget." The upper right area of the meter panel displays the "notification" content having the next greater information value. In this case, "small gadget" cannot be displayed together with "large gadget" according to the assignment based on the information value and the area value.

To solve this problem, constraint expression "large gadget&small gadget" is used. As described above, "large gadget&small gadget" signifies displaying both "large gadget" and "small gadget." As illustrated in FIG. 22(b), the center area of the meter panel displays "large gadget" and the upper right area thereof displays "small gadget."

As illustrated in FIG. 23(a), similarly to FIG. 22(b), the center area of the meter panel displays "large gadget" and the upper right area thereof displays "small gadget." This is because exclusion constraint expression "large gadget&small gadget" is used to display both "large gadget" and "small gadget." However, there may be a need to display both if possible but display neither if either cannot be displayed.

In such a case, constraint expression "large gadget+small gadget" is used. This constraint expression signifies displaying both "large gadget" and "small gadget" or displaying neither thereof. In this case, displaying "large gadget" at the center area of the meter panel always displays "small gadget" at the upper right area thereof (see FIG. 23(a)). When the "night view" content is active, "night view" is assigned and displayed at the center area of the meter panel (see FIG. 23(b)) because the "night view" content has the information value set to "170" (see FIG. 15). In this case, "large gadget" is not displayed and "small gadget" is also not displayed accordingly.

When constraint expression "large gadget|small gadget" is used, "large gadget" and "small gadget" are displayed if both are displayable as illustrated in FIG. 23(a). However, at least one of "large gadget" and "small gadget" is displayed if "night view" is greater than "large gadget" as illustrated in FIG. 23(b). As a result, the upper right area of the meter panel displays "small gadget."

If "large gadget" and "small gadget" are active and no constraint expression is used, the center area of the meter panel displays "large gadget" and the upper right area thereof displays "small gadget" as illustrated in FIG. 24(a). However, there may be a request to display one of "large gadget" and "small gadget."

In such a case, constraint expression "large gadget^small gadget" is used. This constraint expression signifies displaying "large gadget" or "small gadget" as described above. The "large gadget" content has the information value set to "120"

and is therefore assigned prior to the "small gadget" content whose information value is set to "50." When the center area of the meter panel displays "large gadget," the upper right area thereof does not display "small gadget" (see FIG. 24(b)).

FIGS. 25(a) and 25(b) assume that "night view," "large gadget," "notification," and "small gadget" are active. The "night view" content has the information value set to "170" and is greater than "large gadget" whose information value is set to "120." Therefore, "night view" is assigned and displayed at the center area of the meter panel. Constraint expression "large gadget^small gadget" displays one of "large gadget" and "small gadget." The "notification" content having the great information value is not displayed. The upper right area of the meter panel displays "small gadget" (see FIG. 25(a)).

In such a case, constraint expression "large gadget/small gadget" is used. This constraint expression signifies displaying "large gadget" or "small gadget" or displaying neither thereof. If the "notification" content has greater information value, it is displayed at the upper right area of the meter panel (see FIG. 25(b)).

The use of these indispensable exclusion constraint expressions can satisfy requests that discord with the assignment based on the information value and the area value. For example, it is possible to assign necessary contents to a given area or avoid redundantly displaying duplicate contents in multiple areas.

The present disclosure is not limited to the above-mentioned embodiments but may be otherwise variously embodied within the spirit and scope of the disclosure.

(a) As described above, contents and areas are managed only according to their attributes. The same algorithm can assign contents to areas regardless of content types and distinction among the display apparatuses 21 through 23.

For example, any one of the A display apparatus 21 through the C display apparatus 23 may fail. In such a case, the display control apparatus 1 according to the above-mentioned embodiments allows the area management portion 12 to update the management information and enable assignment of contents to areas without changing the algorithm.

Similarly, it is easy to additionally connect a D display apparatus 50 as illustrated in FIG. 1. Also in this case, the area management portion 12 may update the management information to conform to the D display apparatus 50.

The D display apparatus 50 exemplifies mobile telephones including smartphones or information terminals including PDAs. The D display apparatus 50 itself may acquire area information. Alternatively, the content management portion 11 may acquire contents from the D display apparatus 50.

(b) The first and second embodiments perform the value change process, which is not indispensable, however. Another embodiment may omit the value change. Alternatively, the value change process may be performed only when a predetermined condition is satisfied.

(c) The first embodiment allows the value change process (S100 in FIG. 4) to change both the information value and the area value. One of the information value and the area value may be unchanged and only the other may be changed.

The first embodiment changes the information value and the area value based on the vehicle running situation indicating whether the vehicle is running.

The value may be changed according to more detailed running situations such as low-speed running and high-speed running, for example. A system capable of calculating loads on a driver may be used together and the value may be changed in consideration of loads on the driver.

These are also applicable to the value change process at S200 in FIG. 9 according to the second embodiment. The suitability table in FIG. 7 may be changed based on vehicle running situations similarly to the content value and the area suitability.

(d) The above-mentioned embodiments compare the content size with the area size to select an area capable of placing contents. For example, contents may be reduced or scrolled for display to assign a content to an area whose area size is smaller than the content size.

(e) The first embodiment assigns contents in descending order of information value to areas having area value less than the information value so as to select an area having the greatest area value (S170 in FIG. 4). On the other hand, it may be favorable to assign contents to an area having the second area value or later. This frees an area having the great area value. That area can be used to fast display an urgent content, when "activated."

(f) The second embodiment uses the visual line characteristic, the expressiveness characteristic, and the operation characteristic as the content characteristic and the area characteristic. The other characteristics may be used.

(g) Concerning the indispensable exclusive relation among contents, the second embodiment processes a indispensable exclusion constraint expression (S220 in FIG. 9) to generate the content list based on the indispensable exclusion constraint expression (S230). Further, indispensable exclusion constraint expressions may be prescribed concerning the indispensable exclusive relation among areas and may be processed similarly.

This can determine content-area combinations including the indispensable exclusive relation among areas and display information more appropriately. In this case, the indispensable exclusion constraint expression to define the indispensable exclusive relation among areas corresponds to "area usage information." When the assignment management portion 13 stores indispensable exclusion constraint expressions, the assignment management portion 13 corresponds to an "area usage information storage portion."

The present disclosure can provide display control apparatuses compliant to various modes.

For example, a display control apparatus assigns contents to be displayed to multiple display areas on a screen of a display apparatus mounted on a vehicle. The display control apparatus can be provided according to the following configuration.

The display control apparatus includes the content management portion, the area management portion, and the content assignment control portion.

The content management portion manages contents associated with the content information as a content attribute. The area management portion manages areas associated with the area information as an area attribute.

Specifically, the content assignment control portion generates a content list of contents. The content assignment control portion determines content-area combinations in the order of the content list based on the content information and the area information.

That is, the content assignment control portion determines content-area combinations based on the content information and the area information. At this time, the content assignment control portion generates a content list from the contents and determines combinations in the order of the content list. The same process is repeated in the order of the content list to determine content-area combinations. Combination rules are based on the content information and the area information. This enables flexible arrangement of contents.

Specifically, the content information is supposed to contain information value attached to each content. The area information is supposed to contain area value attached to each area. For example, an urgent content relatively increases the information value. The head-up display requires a small amount of visual line movement during vehicle running and relatively increases the area value. In this case, the content assignment control portion compares the information value with the area value. The content assignment control portion determines that the content can be assigned to the area if the information value is greater than the area value. This enables to assign contents to areas according to a balance between the information value and the area value so that users can easily understand the displayed information unlike the mere use of priorities according to the related art.

If multiple assignable areas are available, the content assignment control portion assigns contents to areas in descending order of area value so as to first select an area having the greatest area value. This enables contents to be assigned to areas in descending order of area value, allowing users to easily understand the displayed information.

Under this condition, the content assignment control portion is supposed to generate the content list of contents sorted in descending order of information value. Contents are assigned in descending order of information value to areas having great area value. This highlights the effect of assigning contents to appropriate areas.

It may be favorable to calculate an evaluation value from the content information and the area information and determine a content-area combination based on the evaluation value.

That is, the content assignment control portion may determine a content-area combination based on an evaluation value calculated from the content information and the area information. Unlike the mere use of priorities according to the related art, the content assignment control portion can arrange contents in appropriate areas and display information so that users can easily understand the displayed information.

Specifically, the content information contains content value indicating information value for target viewers. The area information contains area suitabilities indicating locational suitabilities for target viewers. The content assignment control portion is considered to determine content-area combinations based on target viewer evaluation values calculated based on content value and area suitability.

The target viewer represents a driver, a front-seat passenger, and a rear-seat passenger (also applicable to the following description). For example, a content needed for driving relatively increases the content value for the driver. A head-up display area requires a small amount of visual line movement during vehicle running and relatively increases the area suitability for the driver.

The content is associated with the content value and the area is associated with the area suitability to provide an appropriate content-area combination. The content value and the area suitability are available for each target viewer. A target viewer evaluation value acquired from the content value and the area suitability determines a content-area combination so that users can easily understand the displayed information.

The content assignment control portion determines content-area combinations in the order of the generated content list. The content assignment control portion may generate a content list of contents sorted in descending order of content value. This determines content-area combinations in descending order of content value. Therefore, the contents can be assigned to proper areas.

Contents and areas are considered to have corresponding characteristics. The content information contains content characteristics concerning contents. The area information contains area characteristics concerning areas. The content assignment control portion may determine content-area combinations based on characteristic evaluation values calculated based on the content characteristic and the area characteristic. This determines a content-area combination in consideration of content and area characteristics. This enables to display information so that users can easily understand the displayed information.

Specifically, the content characteristic may contain a visual line characteristic indicating whether the content is involved with the driver's visual line movement. The area characteristic may contain a visual line characteristic indicating whether the driver's visual line movement increases. For example, the "vehicle speed" content, which needs to be frequently checked during driving, is the content that is involved with the driver's visual line movement. A head-up display area requires a small amount of visual line movement during vehicle running and does not increase the driver's visual line movement. This enables to determine a content-area combination based on characteristic evaluation values concerning the driver's visual line movement. Information can be displayed so that users can easily understand the displayed information.

Specifically, the content characteristic may contain an expressiveness characteristic indicating whether the expressiveness is needed. The area characteristic may contain an expressiveness characteristic indicating whether the expressiveness is great. For example, the "map" content for navigation supplies a large amount of information and requires the expressiveness (e.g., resolution or color display). A color liquid crystal display apparatus is installed at the center of a vehicle and contains an area that requires great expressiveness. This enables to determine a content-area combination based on characteristic evaluation values concerning the expressiveness. Information can be displayed so that users can easily understand the displayed information.

Specifically, the content characteristic contains an operation characteristic indicating whether an operation is needed. The area characteristic contains an operation characteristic indicating whether an operation is possible. For example, the "audio information" content requires operations such as selecting musical tunes. A liquid crystal display apparatus integrated with a touch panel uses an area capable of operations. This enables to determine a content-area combination based on characteristic evaluation values concerning the operability. Information can be displayed so that users can easily understand the displayed information.

A characteristic evaluation value needs to be derived from the content characteristic and the area characteristic. For this purpose, a correlation information storage portion may be provided to store correlation information that derives a characteristic evaluation value from the content characteristic and the area characteristic. In this case, the content assignment control portion derives a characteristic evaluation value from the content characteristic and the area characteristic based on correlation information stored in the correlation information storage portion. For example, the content characteristic and the area characteristic are transformed into numeric information that numerically represents the characteristics. The correlation information is available as a suitability table to find the suitability to derive a characteristic evaluation value from both characteristic values. This enables to relatively easily derive characteristic evaluation values from the content characteristic and the area characteristic.

The correlation information in the correlation information storage portion may vary with vehicle situations. For example, the correlation information to derive characteristic evaluation values depends on whether the vehicle is stopped or running. This enables to drive more appropriate characteristic evaluation values.

Contents may need to be scrolled or reduced for display if the contents require a larger area than the area size.

For this reason, the content information contains a content size needed to display information. The area information contains an area size indicating the size of an area. The content assignment control portion may compare the area size with the content size and determine a content-area combination so that the content fits into the area. This eliminates the need to scroll or reduce contents for display and allows users to easily understand the displayed information.

Contents and areas may be combined when comparing the information value with the area value, finding evaluation values based on the content value and the area suitability, and comparing the content size with the area size.

The content information contains a content size needed to display information. The area information contains an area size indicating the size of an area. The content assignment control portion may determine a content-area combination so that the content fits into an area whose area size is the most approximate to the content size. This prevents contents from being reduced or increasing margins around the contents and allows users to easily understand the displayed information.

Some contents may need indispensable display or exclusive display. For example, the "vehicle speed" content requires at least one of analog display (meter display) and digital display (numeric display).

For this purpose, a content display information storage portion may be provided to store content display information that specifies the indispensable exclusive relation among contents. In this case, the content assignment control portion determines a content-area combination based on the content display information stored in the content display information storage portion. This enables to determine a content-area combination including the indispensable exclusive relation among contents. The information can be displayed more appropriately.

Specifically, the content display information corresponds to a indispensable exclusion constraint expression indicating the indispensable exclusive relation among contents represented by predetermined operators. In this case, the content assignment control portion determines a content-area combination so as to satisfy indispensable exclusion constraint expressions.

This enables to determine a content-area combination including the indispensable exclusive relation among contents.

There may be a need to avoid using some areas concurrently with the others similarly to contents.

For this purpose, an area usage information storage portion may be provided to store area usage information that specifies the indispensable exclusive relation among areas. In this case, the content assignment control portion determines a content-area combination based on the area usage information stored in the area usage information storage portion. This enables to assign contents to areas including the indispensable exclusive relation among areas. The information can be displayed more appropriately.

Specifically, the area usage information corresponds to a indispensable exclusion constraint expression indicating the indispensable exclusive relation among areas represented by predetermined operators. In this case, the content assignment control portion determines a content-area combination so as to satisfy indispensable exclusion constraint expressions. This enables to determine a content-area combination including the indispensable exclusive relation among areas.

An area needs to be divided for display if the number of contents increases. The area management portion may be configured as a hierarchical data structure in which a predetermined area can be managed both as a single area and as multiple areas resulting from dividing the predetermined area and the multiple areas are lower in hierarchy than the single area. Specifically, an area is divided into areas beforehand. The area before the division is managed as a parent. The divided areas are managed as children. In this case, the content assignment control portion determines a content-area combination based on the hierarchical data structure. This enables to easily understand the parental relation among areas and fast find a content-area combination.

The content information about contents may be changed depending on vehicle situations. Accordingly, the content management portion may be capable of changing the content information based on vehicle situations. For example, the content information associated with contents may be changed depending on whether the vehicle is stopped or running. This enables to determine more appropriate content-area combinations.

Similarly, the area information about areas may be changed depending on vehicle situations. Accordingly, the area management portion may be capable of changing the area information based on vehicle situations. For example, the area information associated with areas may be changed depending on whether the vehicle is stopped or running. This enables to determine more appropriate content-area combinations.

The content management portion may manage whether to display each of contents. For example, each content is associated with a flag indicating whether to display the content. The flag may be set or reset depending on vehicle situations. The flag may be set or reset depending on user manipulations. The flag may be set or reset depending on whether the content issues a display request. In this case, the content assignment control portion generates a content list from contents to be displayed. This enables to easily manage whether to display contents.

Some types of contents may previously determine appropriate areas. For this purpose, an assignment information storage portion may be provided to store assignment information about specific contents and areas. The content assignment control portion may determine a content-area combination based on the assignment information stored in the assignment information storage portion. The assignment information may be predetermined or may be specified by users. This enables to assign contents to more appropriate areas and ensure design possibilities. Intended contents can be assigned to areas intended by users.

The content management portion may acquire contents via the in-vehicle network. The contents may be acquired from an additionally connected external device. The external device represents mobile telephones including smartphones or information terminals including PDAs. If the contents are associated with the content information for management, the same algorithm can be used to determine content-area combinations regardless of content types.

The same applies to areas. If the areas are associated with the area information for management, the same algorithm can be used to determine content-area combinations regardless of display apparatus types. The area management portion may manage areas on multiple display apparatuses. In this case, the area management portion may update the area under management when some of the display apparatuses are attached or detached. If the display apparatus maintains the area information, the area information from the display apparatus to be attached or detached updates the area information to be managed.

According to another mode, a display control apparatus assigns contents to be displayed to multiple display areas on a screen of a display apparatus mounted on a vehicle. The display control apparatus can be provided according to the following configuration. Each of contents is given a content parameter including at least one of a content evaluation value and a content size. The content evaluation value indicates a content display priority. The content size indicates a content display size. Each of areas is given an area parameter including at least one of an area evaluation value and an area size. The area evaluation value indicates a content assignment priority. The area size indicates an area display size. The display control apparatus includes the content assignment control portion. The content assignment control portion determines the order of assigning the contents to the areas based on the content parameter. In this order, the content assignment control portion checks for availability of areas capable of displaying the content based on the relation between the content parameter and the area parameter. Based on a check result, the content assignment control portion sequentially determines combinations of the contents and the areas.

The content assignment control portion may determine the order of assigning contents to the areas in descending order of the content evaluation values contained in the content parameter.

The content assignment control portion checks for availability of areas capable of displaying the content according to the relation between the content parameter and the area parameter. In this case, the content assignment control portion compares the content evaluation value contained in the content parameter with the area evaluation value contained in the area parameter. The content assignment control portion may determine the availability of an area capable of displaying the content if the content evaluation value is larger than the area evaluation value.

The content assignment control portion checks for availability of areas capable of displaying the content according to the relation between the content parameter and the area parameter. In this case, the content assignment control portion compares the content size contained in the content parameter with the area size contained in the area parameter. The content assignment control portion may determine the availability of an area capable of displaying the content if the content size is smaller than the area size.

The content evaluation values may be changed according to vehicle situations. When the content evaluation value is changed, the content assignment control portion revises the order of assigning the contents to the area. When the order is further changed, the content assignment control portion checks for availability of areas capable of displaying contents based on the relation between the content parameter and the area parameter. Based on the determination, the content assignment control portion may successively respecify content-area combinations.

The content parameter contains the content evaluation value. The area parameter contains the area evaluation value. The content evaluation value and the area evaluation value are provided for each target viewer as a display target in a vehicle compartment. The content assignment control portion may calculate an evaluation value containing a target viewer evaluation value for each of the target viewers based on the content evaluation value and the area evaluation value and may determine a combination of the content and the area based on the evaluation value.

The content parameter contains a content characteristic including at least one of a visual line characteristic, an expressiveness characteristic, and an operation characteristic. The area parameter contains an area characteristic corresponding to the content characteristic. The content assignment control portion may calculate an evaluation value containing a characteristic evaluation value based on the content characteristic and the area characteristic and may determine a combination of the content and the area based on the evaluation value.

A indispensable exclusion constraint expression is stored to define a rule of displaying the contents. The content assignment control portion may determine an order of assigning the content to the area based on the indispensable exclusion constraint expression.

The content assignment control portion may determine an order of assigning the content to the area so that the content associated with the indispensable exclusion constraint expression is assigned first.

If the indispensable exclusion constraint expression contains a content not to be displayed, the content assignment control portion may rewrite the indispensable exclusion constraint expression to a constraint expression for a content to be displayed.

According to still another mode, a display control apparatus assigns a content to be displayed to multiple display areas on a screen of a display apparatus. The display control apparatus to be provided includes a content management portion, an area management portion, and a content assignment control portion. The content management portion manages content information as an attribute of the content. The area management portion manages area information as an attribute of the area. Based on the information from the content management portion and the area management portion, the content assignment control portion evaluates a content evaluation value representing value of displaying the content on the area and an area parameter representing suitability of assigning the content to the area. Based on an evaluation result, the content assignment control portion determines a combination of the content and the area.

The display apparatus is provided at different locations in a vehicle compartment of the vehicle so as to be visible for each target viewer. The content assignment control portion may determine a combination of the content and the area based on the content evaluation value of the content for each target viewer and area suitability representing the area parameter for each target viewer.

The content assignment control portion may determine a combination of the content and the area by comparing target viewer evaluation values calculated for each combination of the content and the area and selecting a combination of the relatively large target viewer evaluation values based on the content evaluation value of the content and the area suitability for each target viewer.

The content contains a content characteristic selected from at least one of a visual line characteristic, an expressiveness characteristic, and an operation characteristic. The area contains an area characteristic corresponding to the content characteristic. The content assignment control portion may determine a combination of the content and the area by comparing characteristic evaluation values calculated for each combination of the content and the area and selecting a combination of the relatively large characteristic evaluation values based on the content characteristic of the content and the area characteristic of the area.

The present disclosure is not limited to the above-mentioned embodiments, configurations, and modes. The technical scope of the disclosure also includes embodiments, configurations, and modes that may result from an appropriate combination of the technical portions disclosed in different embodiments, configurations, and modes.

The invention claimed is:

1. A display control apparatus that assigns display target contents to a plurality of areas configured as display areas in a screen of a display apparatus mounted on a vehicle, the display control apparatus comprising:
a content management portion that manages the contents in association with respective content information indicating attributes of the contents;
an area management portion that manages the areas in association with respective area information indicating attributes of the areas; and
a content assignment control portion that generates a content list listing the contents and determines combinations of the contents and the areas based on the content information and the area information in an order of the content list,
wherein the content information contains information value indicating value of the content,
wherein the content assignment control portion generates the content list listing the contents in descending order of the information value.

2. The display control apparatus according to claim 1, wherein the area information contains area value indicating value of the area, and
wherein the content assignment control portion compares the information value with the area value, and determines that the content is assignable to the area when the information value is greater than the area value.

3. The display control apparatus according to claim 2, wherein the content assignment control portion successively assigns the contents to the areas in order from the area having the greatest area value among the areas.

4. The display control apparatus according to claim 1, wherein the content assignment control portion determines the combinations of the contents and the areas based on evaluation values calculated from the content information and the area information.

5. The display control apparatus according to claim 4, wherein the content information contains content value indicating information value for each target viewer,
wherein the area information contains area suitability indicating locational suitability for each target viewer, and
wherein the content assignment control portion determines the combinations of the contents and the areas based on target viewer evaluation values calculated based on the content value and the area suitability.

6. The display control apparatus according to claim 5, wherein the content assignment control portion generates the content list in which the contents are sorted in descending order of the content value.

7. The display control apparatus according to claim 5, wherein the content information contains a content characteristic concerning the content,
wherein the area information contains an area characteristic concerning the area, and
wherein the content assignment control portion determines the combinations of the contents and the areas based on characteristic evaluation values calculated based on the content characteristic and the area characteristic.

8. The display control apparatus according to claim 7, wherein the content characteristic contains a visual line characteristic indicating whether the content is involved with driver's visual line movement, and
wherein the area characteristic contains a visual line characteristic indicating whether driver's visual line movement increases.

9. The display control apparatus according to claim 7, wherein the content characteristic contains an expressiveness characteristic indicating whether expressiveness is needed, and
wherein the area characteristic contains an expressiveness characteristic indicating whether expressiveness is great.

10. The display control apparatus according to claim 7, wherein the content characteristic contains an operation characteristic indicating whether an operation is needed, and
wherein the area characteristic contains an operation characteristic indicating whether an operation is possible.

11. The display control apparatus according to claim 7, wherein a correlation information storage portion is provided to store correlation information for deriving the characteristic evaluation value from the content characteristic and the area characteristic, and
wherein the content assignment control portion derives the characteristic evaluation value from the content characteristic and the area characteristic based on the correlation information stored in the correlation information storage portion.

12. The display control apparatus according to claim 11, wherein the correlation information in the correlation information storage portion varies with a vehicle situation.

13. The display control apparatus according to claim 1, wherein the content information contains a content size indicating a size needed to display information,
wherein the area information contains an area size indicating the size of the area; and
wherein the content assignment control portion compares the area size with the content size and determines the combinations of the contents and the areas so that the contents fit into the areas.

14. The display control apparatus according to claim 1, wherein the content information contains a content size indicating a size needed to display information,
wherein the area information contains an area size indicating the size of the area, and
wherein the content assignment control portion determines the combinations of the contents and the areas so that the contents fit into the areas whose area sizes are most approximate to the content sizes.

15. The display control apparatus according to claim 1, further comprising:
a content display information storage portion to store content display information for specifying an indispensable exclusive relation among the contents,
wherein the content assignment control portion determines combinations of the contents and the areas based on the content display information stored in the content display information storage portion.

16. The display control apparatus according to claim 15, wherein the content display information corresponds to an indispensable exclusion constraint expression indicating indispensable exclusive relation among contents represented by predetermined operators, and wherein the content assignment control portion determines the combination of the contents and the areas so as to satisfy the indispensable exclusion constraint expression.

17. The display control apparatus according to claim 1, wherein an area usage information storage portion is provided to store area usage information that specifies the indispensable exclusive relation among the areas, wherein the content assignment control portion determines the combinations of the contents and the areas based on the area usage information stored in the area usage information storage portion.

18. The display control apparatus according to claim 17, wherein the area usage information corresponds to an indispensable exclusion constraint expression indicating indispensable exclusive relation among areas represented by predetermined operators, and wherein the content assignment control portion determines the combinations of the contents and the areas so as to satisfy the indispensable exclusion constraint expression.

19. The display control apparatus according to claim 1, wherein the area management portion is provided with a hierarchical data structure in which
a predetermined area is managed both as a single area and as a plurality of areas into which the predetermined area is divided and
the plurality of areas is lower in hierarchy than the single area, and
wherein the content assignment control portion determines the combinations of the contents and the areas based on the hierarchical data structure.

20. The display control apparatus according to claim 1, wherein the content management portion is capable of changing the content information based on a vehicle situation.

21. The display control apparatus according to claim 1, wherein the area management portion is capable of changing the area information based on a vehicle situation.

22. The display control apparatus according to claim 1, wherein the content management portion manages whether to display each of the contents.

23. The display control apparatus according to claim 1, wherein an assignment information storage portion is provided to store assignment information about assignment of a specific content to a specific area, and wherein the content assignment control portion determines the combinations of the contents and the areas based on the assignment information stored in the assignment information storage portion.

24. The display control apparatus according to claim 1, wherein the content management portion acquires the content via an in-vehicle network.

25. The display control apparatus according to claim 1, wherein the content management portion is capable of acquiring the content from an additionally connected external device.

26. The display control apparatus according to claim 1, wherein the area management portion manages the areas on a plurality of display apparatuses.

27. The display control apparatus according to claim 26, wherein the area management portion updates the managed areas when part of the display apparatuses is attached or detached.

28. A display control apparatus that assigns display target contents to a plurality of areas configured as display areas in a screen of a display apparatus mounted on a vehicle, the display control apparatus comprising:
a content parameter provided for each content, the content parameter including at least one of a content evaluation value indicating display priority of the content and a content size indicating display size of the content;
an area parameter provided for each area, the area parameter including at least one of an area evaluation value indicating assignment priority of the content and an area size indicating display size of the area; and
a content assignment control portion that
determines an order of assigning the contents to the areas based on the content parameters,
in the determined order, make a determination of whether there is an available area capable of displaying the content based on relation between the content parameter and the area parameter, and
based on results of the determination, sequentially determines combinations of the contents and the areas,
wherein in descending order of the content evaluation values contained in the content parameters, the content assignment control portion determines the order of assigning the contents to the areas.

29. The display control apparatus according to claim 28, wherein the content assignment control portion determines whether there is an available area capable of displaying the content according to the relation between the content parameter and the area parameter, thereby compares the content evaluation value contained in the content parameter with the area evaluation value contained in the area parameter,
wherein when the content evaluation value is larger than the area evaluation value, the content assignment control portion determines that there is an available area capable of displaying the content.

30. The display control apparatus according to claim 28, wherein:
when the content assignment control portion determines whether there is an available area capable of displaying the content according to the relation between the content parameter and the area parameter, the content assignment control portion compares the content size contained in the content parameter with the area size contained in the area parameter; and
when the content size is smaller than the area size, the content assignment control portion determines that there is an available area capable of displaying the content.

31. The display control apparatus according to claim 28, wherein:
the content evaluation value is changed according to a vehicle situation;
when the content evaluation value is changed, the content assignment control portion revises the order of assigning the contents to the areas;
when the order is changed, the content assignment control portion checks for availability of an area capable of displaying the content based on the relation between the content parameter and the area parameter, and successively respecifies the combinations of the contents and the areas combinations based on the check.

32. The display control apparatus according to claim 28, wherein the content parameter contains the content evaluation value,
wherein the area parameter contains the area evaluation value, wherein the content evaluation value and the area evaluation value are provided for each target viewer in a vehicle compartment, and wherein the content assignment control portion calculates an evaluation value containing a target viewer evaluation value for each of the target viewer based on the content evaluation value and the area evaluation value and determines the combinations of the contents and the areas based on the evaluation value.

33. The display control apparatus according to claim 28, wherein the content parameter contains a content characteristic including at least one of a visual line characteristic, an expressiveness characteristic, and an operation characteristic, wherein the area parameter contains an area characteristic corresponding to the content characteristic, and wherein the content assignment control portion calculates an evaluation value containing a characteristic evaluation value based on the content characteristic and the area characteristic and determines the combinations of the contents and the areas based on the evaluation value.

34. The display control apparatus according to claim 28, wherein an indispensable exclusion constraint expression is stored to define a rule of displaying the contents, and wherein the content assignment control portion determines an order of assigning the contents to the areas based on the indispensable exclusion constraint expression.

35. The display control apparatus according to claim 34, wherein the content assignment control portion determines an order of assigning the contents to the areas so that the content associated with the indispensable exclusion constraint expression is assigned first.

36. The display control apparatus according to claim 34, wherein, when the indispensable exclusion constraint expression contains a content not to be displayed, the content assignment control portion rewrites the indispensable exclusion constraint expression into a constraint expression for a content to be displayed.

37. A display control apparatus that assigns display target contents to a plurality of areas configured as display areas in screens of display apparatuses, the display control apparatus comprising:

a content management portion that manages content information indicating an attribute of each content;

an area management portion that manages area information indicating an attribute of each area; and a content assignment control portion that,
based on the content information and the area information from the content management portion and the area management portion,
evaluates a content evaluation value representing value of displaying the content on the area and an area parameter representing suitability of assigning the content to the area and
determines combinations of the contents and the areas based on a result of the evaluating.

38. The display control apparatus according to claim 37, wherein the display apparatuses are provided at different locations in a vehicle compartment of the vehicle so as to be visible for respective display target viewers, and wherein the content assignment control portion determines the combinations of the contents and the areas based on the content evaluation value of the content for each of the target viewers and area suitability representing the area parameter for each of the target viewers.

39. The display control apparatus according to claim 38, wherein:

based on the content evaluation value of the content and the area suitability for each of the target viewers, the content assignment control portion determines the combinations of the contents and the areas through
comparing with each other target viewer evaluation values that are calculated for respective combinations of the contents and the areas and
selecting a combination providing the relatively large target viewer evaluation values.

40. The display control apparatus according to claim 37, wherein the content contains a content characteristic selected from at least one of a visual line characteristic, an expressiveness characteristic, and an operation characteristic, wherein the area contains an area characteristic corresponding to the content characteristic, and wherein the content assignment control portion determines the combinations of the contents and the areas through
comparing characteristic evaluation values that are calculated for respective combinations of the contents and the areas and
selecting a combination providing the relatively large characteristic evaluation values based on the content characteristic of the content and the area characteristic of the area.

41. A display control apparatus that assigns display target contents to a plurality of areas configured as display areas in a screen of a display apparatus mounted on a vehicle, the display control apparatus comprising:

a content management portion that manages the contents in association with respective content information including information value indicating importance of the contents;

an area management portion that manages a correspondence relation between a content and at least one area to which the content is assignable; and a content assignment control portion that generates a content list listing the contents in descending order of the information value of the contents and determines combinations of the contents and the areas based on the correspondence relation in an order of the content list.

42. The display control apparatus according to claim 41, further comprising:

an area management portion that manages the areas in association with respective area information being information on the areas, wherein the content assignment control portion determines combinations of the contents and the areas based preferentially on the correspondence relation and thereafter determines combinations of the contents and the areas based on the content information and the area information.

43. The display control apparatus according to claim 41, further comprising:

an area management portion that manages the areas in association with respective area information including area value indicating value of the areas, wherein when the area management portion manages the correspondence relation between a content and a plurality of areas to which the content is assignable, the content assignment control portion assigns the content to an area having the greatest area value among the plurality of areas.

44. The display control apparatus according to claim 43, wherein:
in determining combinations of the contents and the areas based preferentially on the correspondence relation and thereafter determining combinations of the contents and the areas based on the content information and the area information, the content assignment control portion assigns a content to an area having the greatest area value among the areas.

45. The display control apparatus according to claim 41, wherein:
an area management portion that manages the areas in association with area information being information on the areas,
wherein the area management portion is provided with a hierarchical data structure in which
a predetermined area is manageable both as a single area and as a plurality of areas into which the predetermined area is divided and
the plurality of areas is lower in hierarchy than the single area, and
wherein the content assignment control portion determines the combinations of the contents and the areas based on the hierarchical data structure.

* * * * *